(12) United States Patent
Goodman et al.

(10) Patent No.: US 9,248,600 B2
(45) Date of Patent: Feb. 2, 2016

(54) BUILD PLATFORM LEVELING AND HOMING

(71) Applicant: MakerBot Industries, LLC, Brooklyn, NY (US)

(72) Inventors: Taylor S. Goodman, Chappaqua, NY (US); Mark Waller, Greenfield, MA (US); Aljosa Kemperle, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 0 days.

(21) Appl. No.: 14/288,893

(22) Filed: May 28, 2014

(65) Prior Publication Data

US 2015/0343688 A1    Dec. 3, 2015

(51) Int. Cl.
| | |
|---|---|
| *B28B 1/14* | (2006.01) |
| *B29C 47/08* | (2006.01) |
| *B29C 67/00* | (2006.01) |
| *B29L 9/00* | (2006.01) |

(52) U.S. Cl.
CPC ......... *B29C 47/0879* (2013.01); *B29C 47/0866* (2013.01); *B29C 67/0051* (2013.01); *B29L 2009/00* (2013.01)

(58) Field of Classification Search
CPC .................... B29C 67/0055; B29K 2995/0073
USPC ............ 264/129, 176.1, 40.1, 40.7, 308, 113, 264/401, 497; 425/145, 150, 375, 112, 113, 425/174.4, 185, 186, 225, 226; 700/118, 700/119, 120; 226/8, 24, 26, 42, 43, 45
See application file for complete search history.

(56) References Cited

U.S. PATENT DOCUMENTS

| | | | | |
|---|---|---|---|---|
| 6,129,872 | A * | 10/2000 | Jang .............................. | 264/75 |
| 6,554,600 | B1 * | 4/2003 | Hofmann et al. ............. | 264/497 |
| 7,625,198 | B2 * | 12/2009 | Lipson et al. ................. | 425/174 |
| 7,744,364 | B2 * | 6/2010 | Turley et al. ................. | 425/225 |

* cited by examiner

*Primary Examiner* — Joseph S Del Sole
*Assistant Examiner* — Thukhanh T Nguyen
(74) *Attorney, Agent, or Firm* — Strategic Patents, P.C.

(57) ABSTRACT

A three-dimensional printer uses its extruder and build platform to properly orient the build platform within a working volume. In a multi-point leveling operation, the extruder is moved to the z-axis origin at a number of x-y positions within the plane of the build platform, and the height of the build platform is adjusted to meet the extruder at the origin. If the build platform is a meltable material such as a plastic, then this leveling process must be performed while the extruder is cool. A homing operation may be performed periodically after leveling in order to realign the z-axis positions of the build platform and extruder. A non-meltable contact point may be usefully provided so that homing can be performed while the extruder is hot, such as immediately before a build or between a number of builds.

18 Claims, 19 Drawing Sheets

BUILD PLATFORM LEVELING AND HOMING

FIELD OF THE INVENTION

This document generally relates to techniques for leveling the build platform and homing the extruder of a three-dimensional printer.

BACKGROUND

There remains a need for improved techniques for leveling a build platform of a three-dimensional printer to reduce skew and z-axis offset.

SUMMARY

A three-dimensional printer uses its extruder and build platform to properly orient the build platform within a working volume. In a multi-point leveling operation, the extruder is moved to the z-axis origin at a number of x-y positions within the plane of the build platform, and the height of the build platform is adjusted to meet the extruder at the origin. If the build platform is a meltable material such as a plastic, then this leveling process must be performed while the extruder is cool. A homing operation may be performed periodically after leveling in order to realign the z-axis positions of the build platform and extruder. A non-meltable contact point may be usefully provided so that homing can be performed while the extruder is hot, such as immediately before a build or between a number of builds.

In one aspect, a method includes providing an extruder and a build platform for a three-dimensional printing process. The build platform may include a planar top surface formed of a low-temperature material for receiving an object fabricated with the three-dimensional printing process, and the build platform may further include a contact point formed of a high-temperature material disposed outside of the planar top surface. The contact point may have a z-axis offset relative to the planar top surface. The method may further include: moving a tip of the extruder to a z-axis origin at a first location in an x-y processing plane within the planar top surface; adjusting a height of the build platform to the tip of the extruder at the first location using a first control; moving the tip of the extruder to the z-axis origin at a second location in the x-y processing plane within the planar top surface; and adjusting the height of the build platform to the tip of the extruder at the second location using a second control that adjusts a second z-axis position of the second location substantially independently from a first z-axis position of the first location, thereby providing a leveled build platform substantially normal to the z-axis. The method may also include: heating the extruder to an operating temperature above a melting temperature of the low-temperature material of the planar top surface and below a melting temperature of the contact point; moving the tip of the extruder to an x-y position corresponding to the contact point; and moving the build platform along the z-axis until the tip of the extruder contacts the contact point.

In another aspect, a computer program product is provided for using an extruder to level a build platform for a three-dimensional printer. The build platform may include a planar top surface formed of a low-temperature material for receiving an object fabricated with the three-dimensional printer, and the build platform may further include a contact point formed of a high-temperature material disposed outside of the planar top surface. The contact point may have a z-axis offset relative to the planar top surface. The computer program product may include non-transitory computer executable code embodied in a non-transitory computer readable medium that, when executing on the three-dimensional printer, performs the steps of: moving a tip of the extruder to a z-axis origin at a first location in an x-y processing plane within the planar top surface; adjusting a height of the build platform to the tip of the extruder at the first location using a first control; moving the tip of the extruder to the z-axis origin at a second location in the x-y processing plane within the planar top surface; and adjusting the height of the build platform to the tip of the extruder at the second location using a second control that adjusts a second z-axis position of the second location substantially independently from a first z-axis position of the first location, thereby providing a leveled build platform substantially normal to the z-axis. The computer program product may also include code that performs the steps of: heating the extruder to an operating temperature above a melting temperature of the low-temperature material of the planar top surface and below a melting temperature of the contact point; moving the tip of the extruder to an x-y position corresponding to the contact point; and moving the build platform along the z-axis until the tip of the extruder contacts the contact point.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
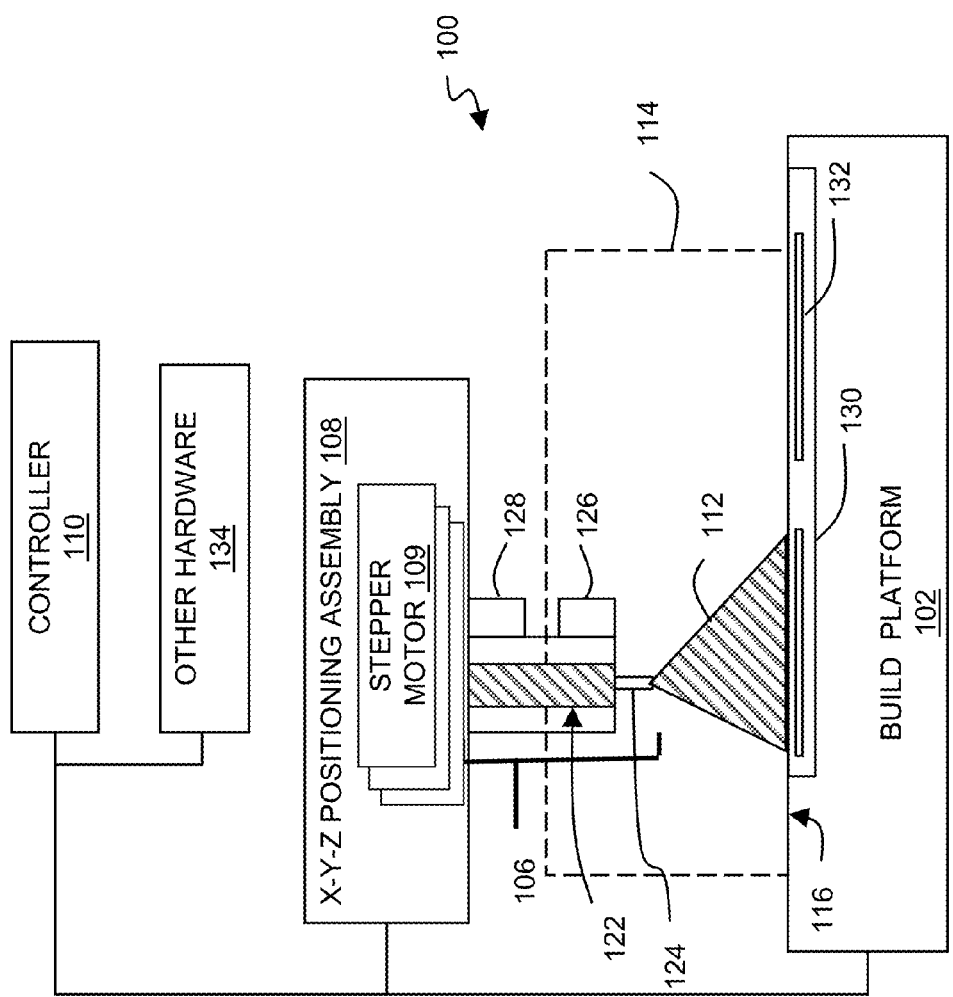
FIG. 1 is a block diagram of a three-dimensional printer.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "above," "below," and the like, are words of convenience and are not to be construed as limiting terms.

Described herein are techniques for leveling the build platform of a three-dimensional printer and homing a z-axis position of the build platform of a three-dimensional printer. The techniques may utilize any of the devices, systems, and methods described in commonly-owned U.S. Pat. Pub. No. 2013/0327917 to Steiner, et al., entitled "Build Platform Leveling with Tactile Feedback," which claims the benefit of U.S. Provisional Application No. 61/657,241. The content of each of these applications is hereby incorporated by reference in its entirety. It will be understood that while the exemplary embodiments herein emphasize leveling the build platform and homing a z-axis position of the build platform for a three-dimensional printer, the principles of this disclosure may be adapted to other fabrication processes. All such variations that can be adapted to use a device, system, and method for leveling/homing a build platform as described herein are intended to fall within the scope of this disclosure.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar (or the surface 116 may include a flexible surface on a rigid "backbone" as explained below). The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by captive nuts or the like so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Similarly, the extruder 124 may be coupled to a z-axis positioning stage while the build platform 102 is coupled to an x-y positioning stage. More generally, any arrangement suitable for controllably positioning the extruder 106 within the working volume 114 and/or relative to the build platform 102 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor or microcontroller. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components as well as a surrounding, ambient temperature. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 and the surrounding air at a fixed, elevated temperature throughout a build, or the other hardware 134 may similarly include a cooling element to cool the working volume.

In yet another aspect, the other hardware 134 may include a sensor to detect a position of at least one of the build platform 102 or the extruder 106. For example, the sensor may detect a z-axis position of the build platform 102 or the extruder 106. This may include an optical detector arranged in a beam-breaking configuration to sense the presence of the build platform 102 or the extruder 106 at a predetermined location. This may also or instead include an imaging device and image processing circuitry to capture an image of the working volume and to analyze the image to evaluate a position of the build platform 102 or the extruder 106. This sensor may be used for example to level or home the build platform 102 as described herein. The feedback from this sensor may be used by the controller 110 to issue processing interrupts or otherwise control operation of the printer 100.

Figure 2:
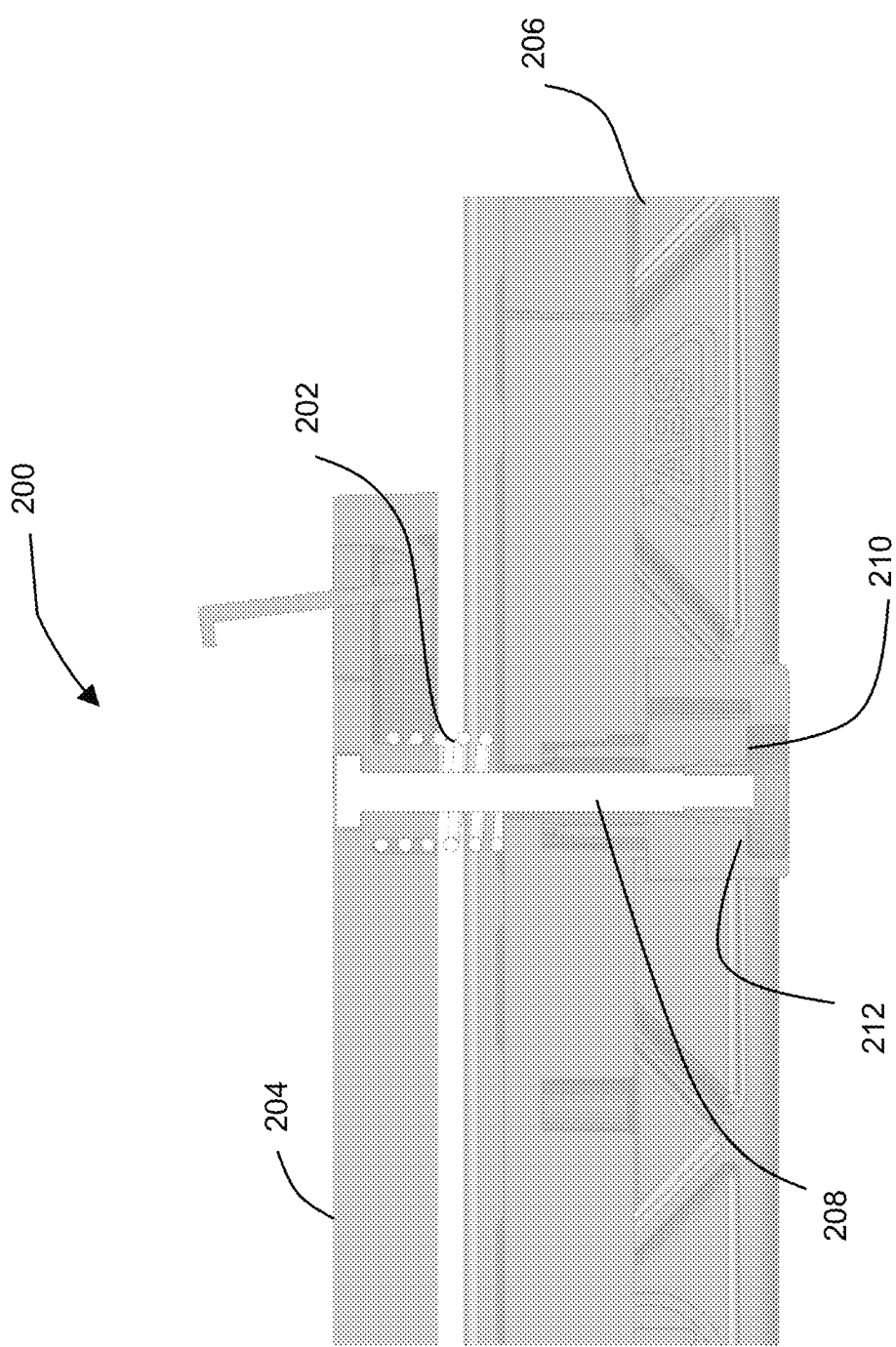
FIG. 2 is a cut away view of a mechanism for adjusting the height of a build platform.

FIG. 2 shows a mechanism 200 for adjusting the height of a build platform with tactile feedback.

In general, a spring 202 may be disposed between a build platform 204 and a support structure 206 to provide a biasing upward force to the build platform relative to the support structure. It will be understood that a variety of springs and spring mechanisms may be used as the spring 202. For example, the spring 202 may be a coil spring held captive as illustrated between the build platform 204 and the underlying support structure 206, with the spring 202 retained in an axial alignment by a thumbscrew 208 having a threaded end passing through a center of the spring 202. The spring 202 may also or instead include a leaf spring or any other type of spring or combination of springs. Similarly, while the general mechanism described with reference to the figure employs a spring that biases the build platform 204 away from the support structure 206, the spring 202 may instead bias the build platform 204 toward the support structure 206, with the thumbscrew 208 providing a contrary force to adjustably position the build platform 204 against the spring 202 and further away from the support structure 206.

The thumbscrew 208 may thread into the build platform 204 (e.g., into threads formed in the build platform 204, or into a threaded nut or the like within the build platform 204) and, by rotation in one direction, mechanically move the build platform 204 toward the support structure 206 against the biasing upward force of the spring 202. The thumbscrew 208 may include a thumbnut. A head 210 of the thumbscrew 208 may include radial grooves, ridges or the like on a top surface 212 that engage corresponding features on a bottom of the support structure 206 in order to provide tactile feedback in the form of clicks or the like as the thumbscrew 208 is rotated among discrete rotational positions. In general, a variety of engagement features may also or instead be employed to provide tactile feedback. These engagement features may usefully perform a dual function of providing a click or the like as the thumbscrew 208 is moved among discrete rotational positions and securing the thumbscrew 208 against unintended movement from such discrete rotational positions. These engagement features may usefully secure the thumbscrew 208 against rotation with a wide range of tenacity according to the desired resistance and tactile feedback. Suitable ranges of applied rotational force, and corresponding dimensions of such engagement features, will be readily appreciated by one of ordinary skill in the art.

In one aspect, the thumbscrew 208 may include eight radial ridges and the support structure 206 may include corresponding grooves providing eight discrete rotational positions for the thumbscrew. Conversely, the thumbscrew 208 may include grooves and the support structure 206 may include ridges, or both surfaces may include complementary ridges. Similarly, while one such engaging surface may provide a number of such features corresponding to the number of desired discrete rotational positions, the complementary features of the opposing surface may use one or more complementary features. For example, where the thumbscrew 208 includes eight radial ridges, the support structure 206 may include a single radial ridge positioned to sequentially engage each of the eight radial ridges of the thumbscrew 208, or the support structure 206 may include two such ridges, four such ridges, or eight such ridges, or any other suitable number. More generally, any mechanical interface may be used that provides a number of discrete rotational positions for the thumbscrew 208 and tactile feedback to a user as the thumbscrew 208 moves from position to position. Similarly, any number of positions may be provided, such as between four and sixteen discrete positions, according to the desired level of fineness to height adjustments for the build platform 204. The translation of these rotational positions into horizontal displacement of the build platform generally depends on the pitch of the threads on the thumbscrew 208. For an embodiment with a one millimeter thread pitch and eight radial grooves, the thumbscrew 208 accommodates adjustments in one-sixteenth millimeter vertical increments. Other arrangements may be provided to simplify user adjustments. For example, the engagement features may include ten equally spaced radial ridges (i.e., at thirty-six degree intervals) so that a 1 mm thread pitch can be adjusted in 0.1 mm increments.

It will be appreciated that the radial ridges (or grooves or other features) may be horizontal features or vertical features. That is, the thumbscrew 208 may have horizontal radial ridges extending radially along the top surface 212, or the thumbscrew 208 may have vertical radial ridges extending radially from a side surface or sidewall of the thumbscrew 208, with corresponding features incorporated into the support structure 206.

While one adjustment point is illustrated, a build platform would typically include two or more such adjustment points, such as four adjustment points at or near four corners of a square or rectangular build platform, or three adjustment points in a triangular arrangement. In a four point system, a height of the build platform may be adjusted, and the z-axis skew of the build platform may also be adjusted relative to a plane of motion for a tool that deposits material on the build platform. Further, while the term "thumbscrew" is used, and a screw that is easily operable with a thumb and finger provides a convenient adjustment mechanism, the "thumbscrew" may also or instead include any tool head suitable for grasping or for adjustment with a tool, or some combination of these.

Figure 3:
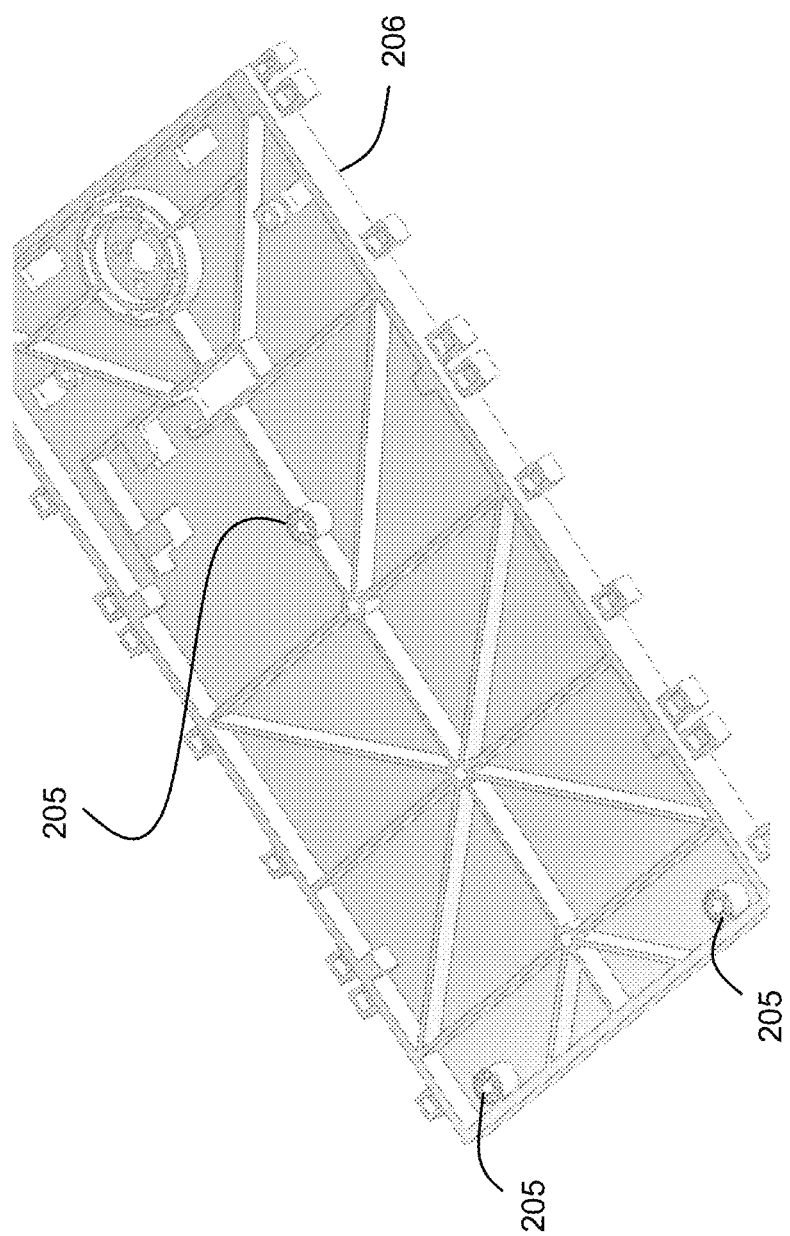
FIG. 3 is a perspective view of a base plate.

FIG. 3 is a perspective view of a base plate 206 (also referred to herein as a support structure 206). The base plate 206 may include several holes 205 to receive thumbscrews. The three holes 205 illustrated in the figure provide a three-point leveling system and provide a through hole for each of three thumbscrews that can be used to adjust the height of the build platform at three predetermined locations. While three holes 205 are shown, some other number such as two holes 205 or four holes 205 may be used. In the embodiment described above, the holes 205 of the base plate 206 do not engage threads of the thumbscrews, instead providing sufficient radial clearance for thumbscrews to rotate freely within the holes 205. It will be appreciated however that other arrangements are possible. For example, a thumbscrew may be affixed to a build platform in a manner that is rotationally free (e.g., by a bearing or the like) while remaining fixed against vertical displacement. The base plate 206 may then be threaded to provide vertical adjustment relative to the build platform when the thumbscrew rotates within the threaded through hole. In another embodiment, the thumbscrew may be rotationally fixed to the build platform, and the thumbscrew may rotate about the threads to provide vertical movement. In either case, a spring or similar mechanism may be positioned between the build platform and the base plate 206 to provide a suitable biasing force.

In one embodiment, the base plate 206 may be coupled to a build platform with a universal or ball joint, and at least two leveling mechanisms may be provided. While this technique permits at least two-point leveling, it generally sacrifices independent control of mean height. As such, the ball joint or other coupling may include an independent height adjustment mechanism to accommodate fully independent z-axis positioning of the build platform relative to the base plate 206 or other component of the printer.

Figure 4:
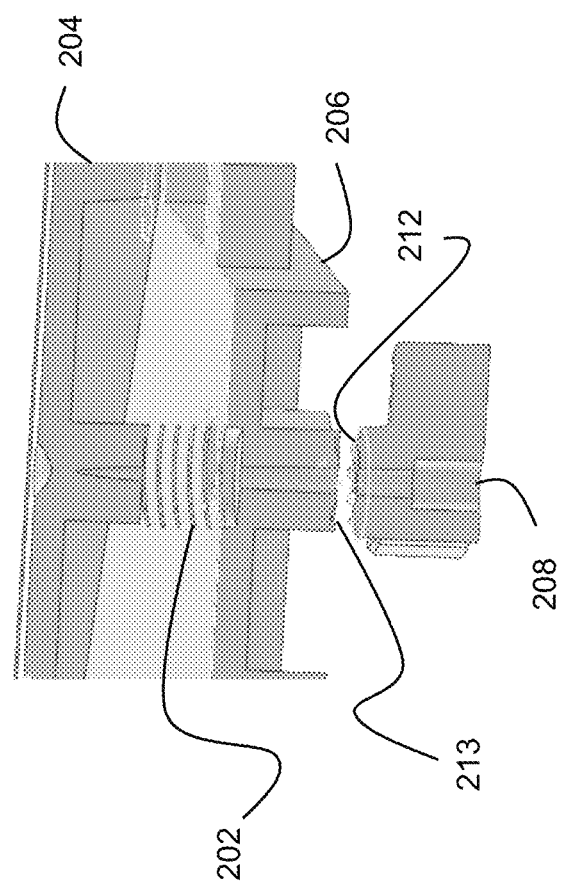
FIG. 4 is a side view of an adjustable-height build platform.

FIG. 4 is a side view of an adjustable-height build platform as described above. A height of the build platform 204 may be adjusted by turning the thumbscrew 208 (threaded portion not shown). The ridges on the top surface 212 may engage with corresponding ridges on the bottom 213 of the support structure 206. The engagement of the ridges on the top surface 212 and the support structure 206 may provide varying degrees of tactile feedback. Additionally, a spring 202 may provide biasing between the ridges of the top surface 212 and corresponding features of the support structure 206.

Figure 5:
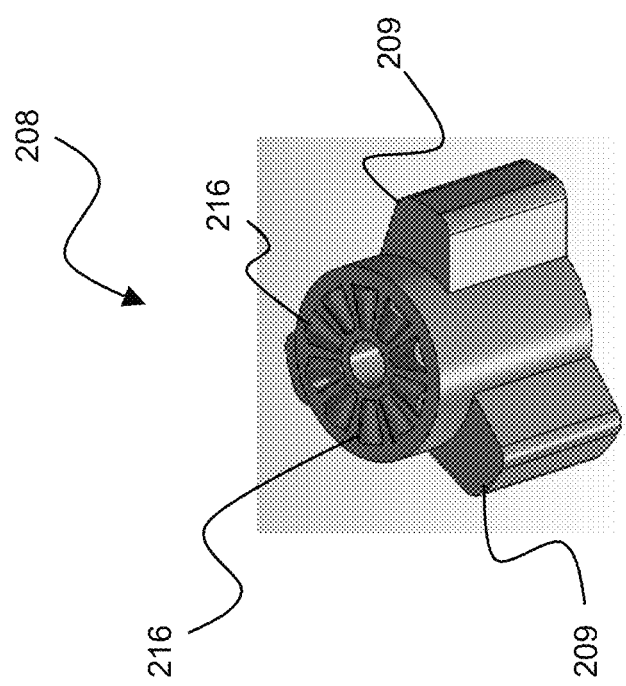
FIG. 5 shows a thumbscrew.
Figure 6:
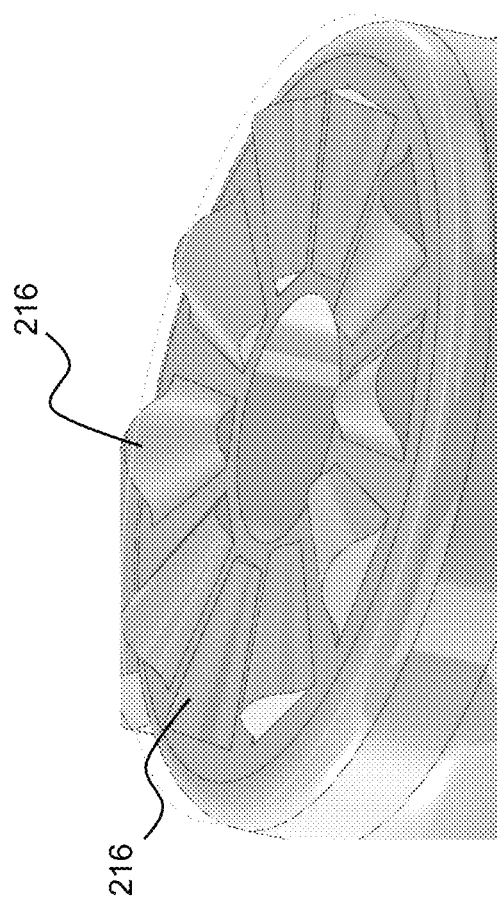
FIG. 6 shows a thumbscrew.

FIGS. 5 and 6 show a thumbscrew 208 with ridges 216 extending radially from the center of the thumbscrew 208 and horizontally in the plane of a build platform or base plate. The thumbscrew may include wings 209 or the like to facilitate grasping and turning of the thumbscrew 208. In this aspect, ten radial ridges 216 are shown. As discussed above, the number of ridges 216 or similar features may vary. Also as noted above, the ridges 216 may be replaced by or complemented with grooves or other engagement features. It should be appreciated that while the term "ridge" may imply a convex feature and the term "groove" may imply a concave feature, the interface for tactile feedback may include engagement features with any combination of either or both such features without departing from the scope of this disclosure. Whether ridges or grooves are used, there will be corresponding engagement features on the support structure to provide tactile feedback.

Figure 7:
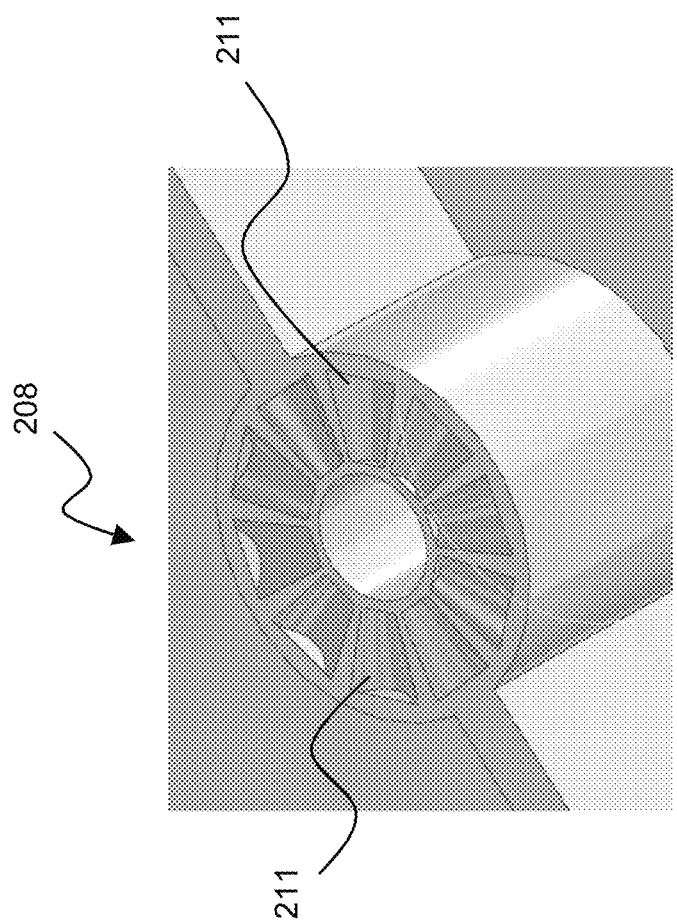
FIG. 7 shows a thumbscrew.

FIG. 7 shows an area of a base plate 208. The base plate 208 may include one or more grooves 211 arranged radially about an axis of a hole through the base plate 208. The grooves 211 may be generally concave, i.e., recessed inward to receive and engage radial ridges or similar features of a thumbscrew.

Figure 8:
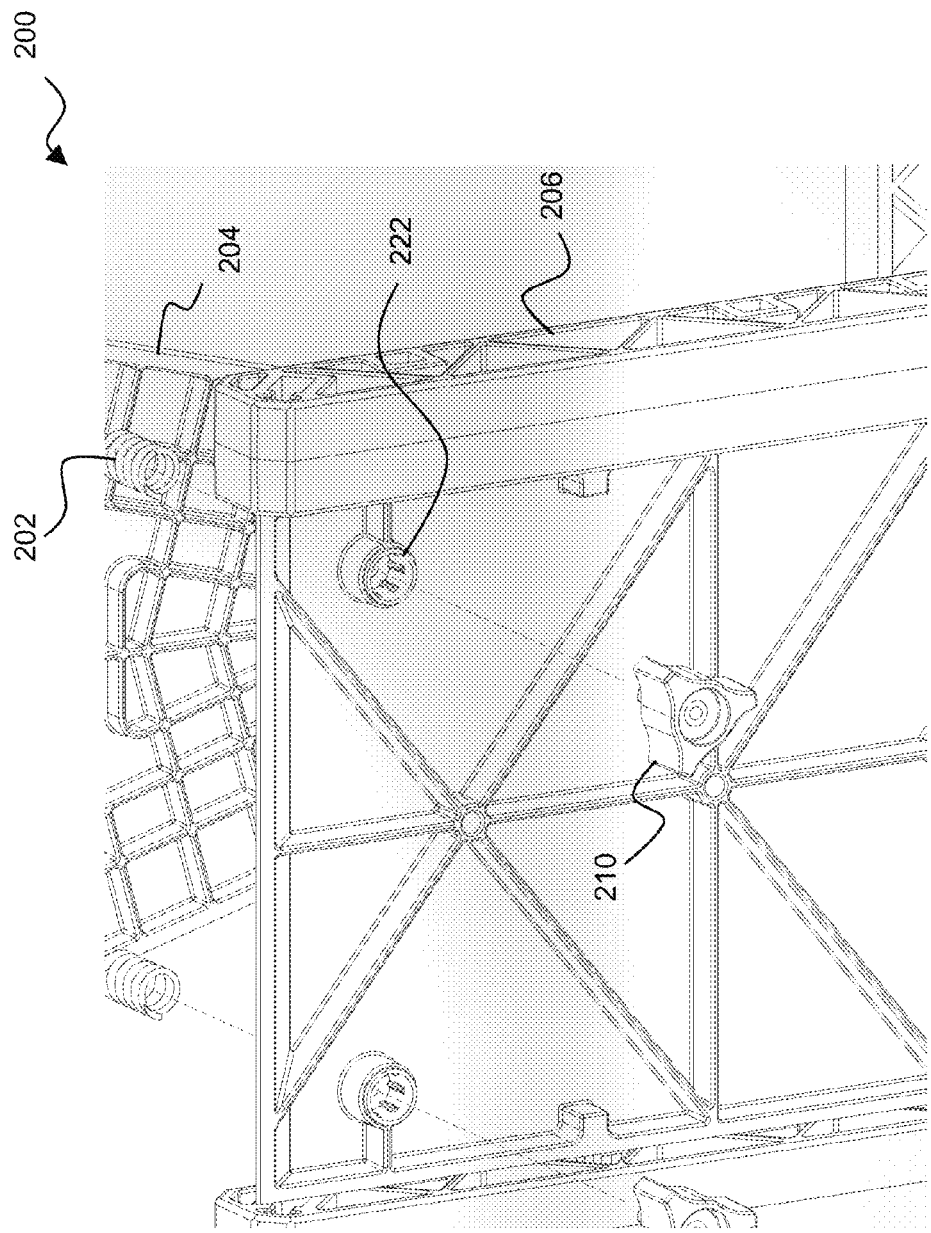
FIG. 8 is a perspective view of a build platform leveling mechanism.

FIG. 8 is a perspective view of a build platform leveling mechanism exploded to illustrate the relationship of various components. A position of the build platform 204 relative to the support structure 206 may be controlled by rotating the thumbscrew 208. In one aspect, the tactile feedback is provided by ridges 222 that are vertically oriented relative to the build platform 204, more specifically extending radially inward toward an axis of the thumbscrew 208 to engage corresponding vertically oriented, radially extending ridges (or grooves) on the sides of the thumbscrew 208. In this arrangement, a biasing spring may not be needed to engage the tactile feedback mechanism, but may still be usefully employed to provide a general vertical bias to the build platform 204 relative to the support structure 206.

Figure 9:
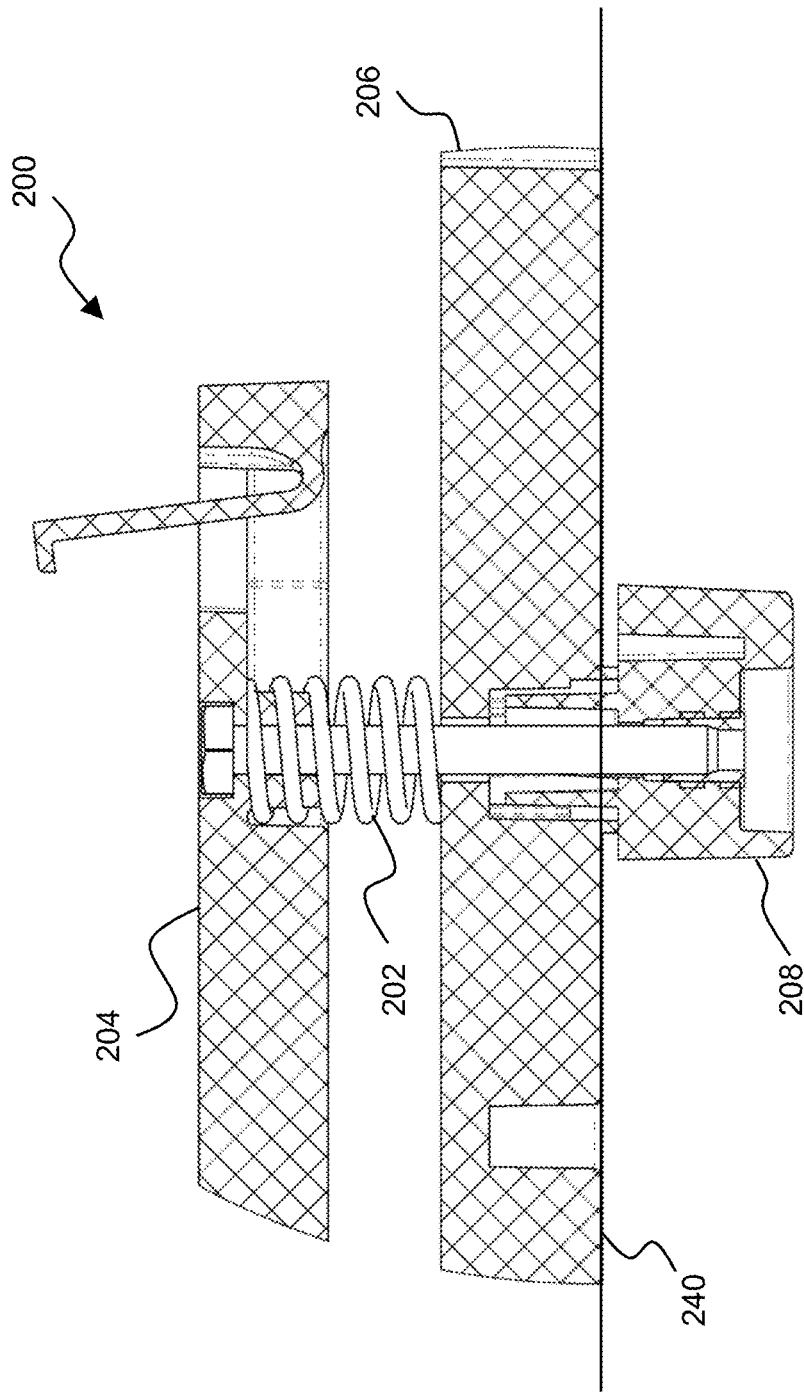
FIG. 9 is a cross section of a build platform leveling mechanism.

FIG. 9 is a cross section of a build platform leveling mechanism. In this embodiment, the ridges of the base plate 206 are parallel to the side of the hole, i.e., vertically oriented relative to a plane 240 of the build platform 204 and the base plate 206, and the ridges provide a mechanical interference engagement with radially extending, vertical ridges or flanges of the thumbscrew 208 to provide tactile feedback while rotating the thumbscrew 208 to adjust a height of the build platform 204 relative to the base plate 206.

Figure 10:
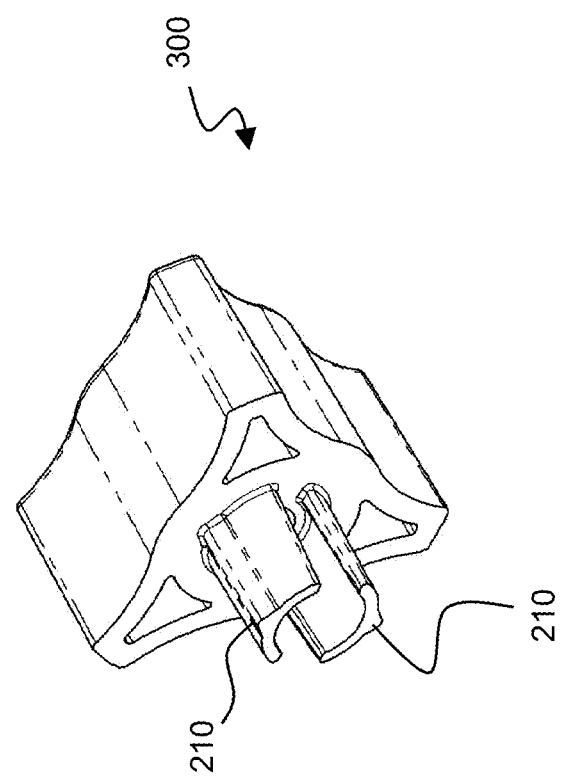
FIG. 10 shows a thumbscrew.

FIG. 10 is a view of a thumbscrew with vertical ridges. The thumbscrew 208 may be used, for example, with the base plate illustrated in FIGS. 8 and 9 to provide tactile feedback for build platform leveling. A ridge 226 of the thumbscrew 208 may provide tactile feedback for rotation of the thumbscrew 208 by engaging corresponding vertical ridges or the like within a base plate. The ridge 226 (of which there may be any number) of the thumbscrew 208 may be flexible to accommodate compression toward a center or axis of the thumbscrew as the ridge contacts mating surfaces during rotation.

Figure 11:
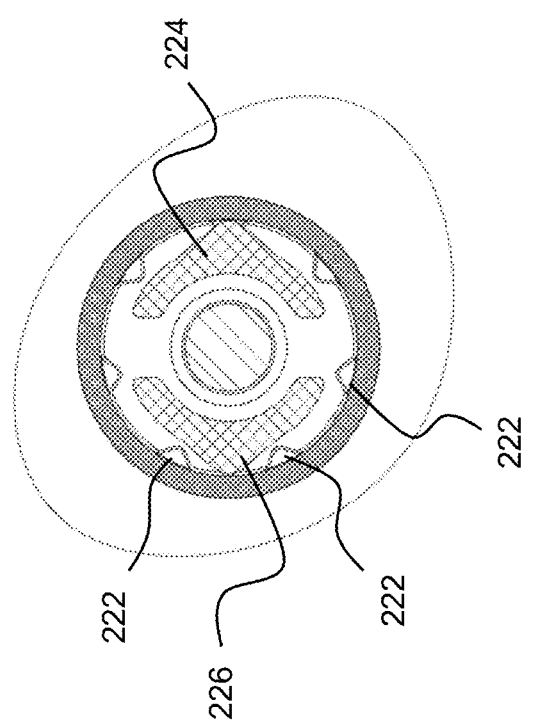
FIG. 11 is a cross section of a thumbscrew seated in a base plate.

FIG. 11 is a cross section of a thumbscrew seated in the base plate. The base plate may include one or more ridges 222 vertically oriented within an opening in the base plate in positions corresponding to the ridges 226 of a thumbscrew positioned therein. The ridges 222 may be of any length and number suitable to provide a desired mechanical interference with the ridge 226 of the thumbscrew.

Figure 12:
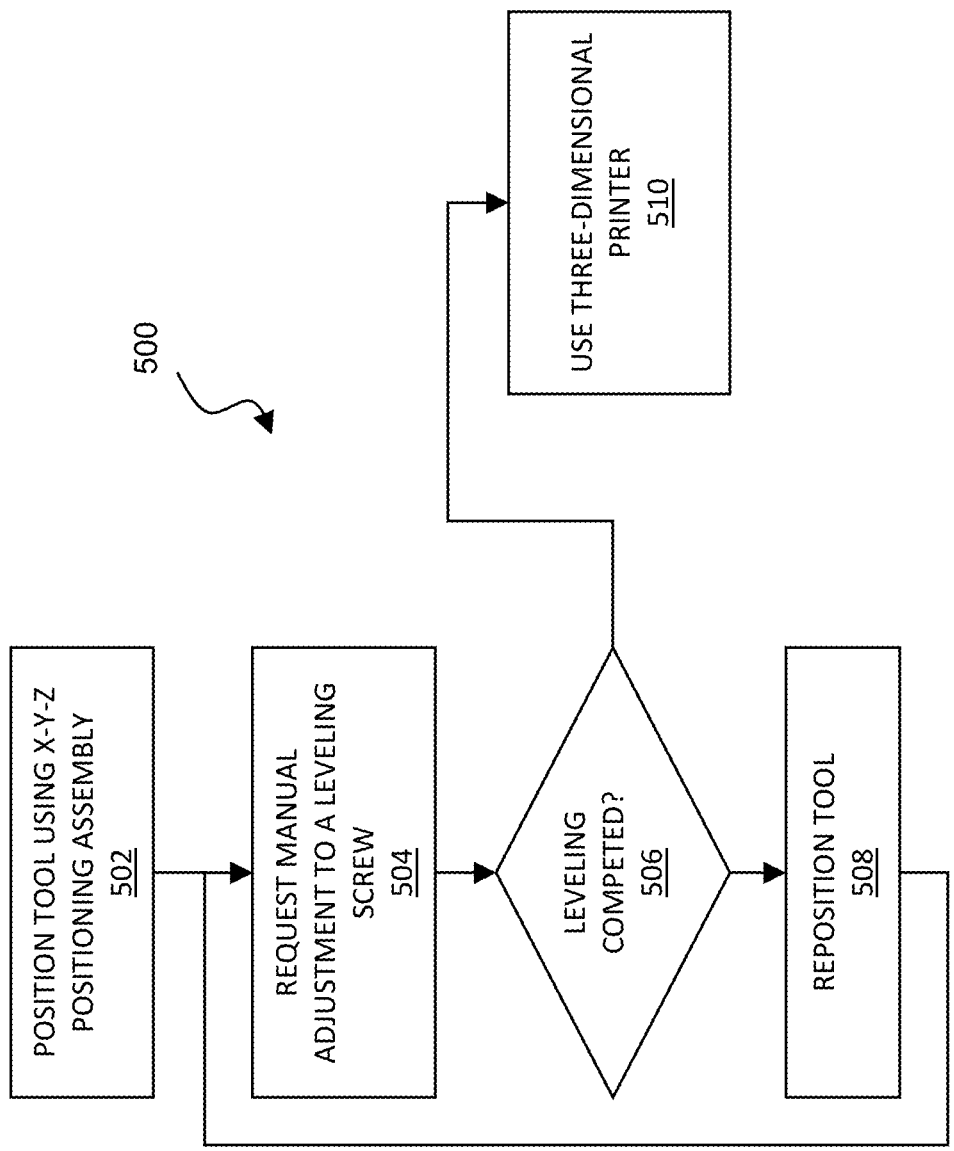
FIG. 12 shows a process for build platform leveling.

FIG. 12 shows a process for build platform leveling. In general, the process 500 may support an interactive user process for leveling a build platform. This may for example include three-point leveling (e.g., where there are three adjustment screws), four-point leveling (e.g., where there are four adjustment screws), or leveling at any other number and arrangement of predetermined locations on the build platform relative to a printer tool or other positioning instrument.

As shown in step 502, the process 500 may begin with positioning a tool with an x-y-z positioning assembly such as any of the positioning assemblies described above. This step may be initiated in response to a user command, or automatically initiated when a printer is powered on for the first time (or for the first time by a customer after shipping from a manufacturing facility or distribution site). In one aspect, a user may issue a command through a control panel of a three-dimensional printer or from a computer connected to the three-dimensional printer. Positioning may include moving the tool, which may be an extruder or other tool or the like of a three-dimensional printer, to a predetermined location such as a corner of a build platform, a center of the build platform, a location on a perimeter of the build platform, a location of a height-adjustment leveling screw in the build platform, or any other suitable location within a working volume. This may also include moving the tool and/or the positioning assembly over a range of positions before moving to the predetermined location, for example to locate a number of end stops or the like for the x-y-z positioning assembly.

As shown in step 504, the process 500 may include requesting a manual adjustment to a leveling screw. This may include a conditional instruction, which may be displayed on a control panel of the printer or on a connected computer or other computing device, or issued as an audible alert or the like from any of the foregoing. For example, the conditional instruction may be referenced to a user-perceived event in the form "turn thumbscrew to the right until the tool touches the build platform, and then turn to the left one click." Or where a shim or other reference is used, the conditional instruction may be referenced to the shim. For example, the conditional instruction may be in the form, "slide a piece of paper between the build platform and the extruder, and then turn the thumbscrew to the right until the paper can just fit between the build platform and the extruder." The instruction may also or instead include absolute instructions. For example, the instruction may take the form, "turn the thumbscrew one click to the right." This form may be particularly useful where the three-dimensional printer includes distance or proximity sensors that can detect a distance between the tool and the build platform, in which case a measured gap can be readily converted into a number of discrete clicks of the thumb screw, and instructions can be provided to the user to provide an appropriate manual leveling operation with the thumbscrew.

As shown in step 506, it may be determined whether a leveling process is completed. This may include detecting the completion of a leveling step, such as any of the steps described above, e.g., in response to user input confirming completion of the step. In another aspect, where the thumbscrew produces audible clicks, this may be determined through audio detection of discrete thumbscrew movements or the like, and may be followed with audio feedback such as a spoken command to stop. Once the particular leveling step is completed, the process 500 may include determining whether additional leveling steps are required, e.g., based upon any suitable leveling protocol. If additional steps are required, the process 500 may proceed to step 508 where the printer tool may be repositioned for additional leveling steps. If additional steps are not required, the process 500 may proceed to step 510 where the printer may be used for fabrication in any suitable fashion.

As shown in step 508, where additional leveling steps are required, the three-dimensional printer may reposition a tool such as to a next sequential predetermined location on the build platform. The process 500 may then return to step 504 where additional manual adjustments may be requested.

By repeating the above process 500 in this manner for a number of predetermined locations on a build platform, the height of a build platform may be adjusted according to any predetermined protocol, and skew of the build platform may be reduced or eliminated relative to an x-y plane or the like of a three dimensional printer or a positioning assembly for same.

It will be readily appreciated that the various steps described above may be reordered, omitted, modified, or supplemented with additional steps according to a desired leveling protocol. For example, after receiving a sequence of manual adjustments at predetermined locations, the process 500 may return to the leveled positions, or to any other representative, predetermined locations on the build platform to request confirmation of accurate leveling. All such variations are intended to fall within the scope of this disclosure.

Figure 13:
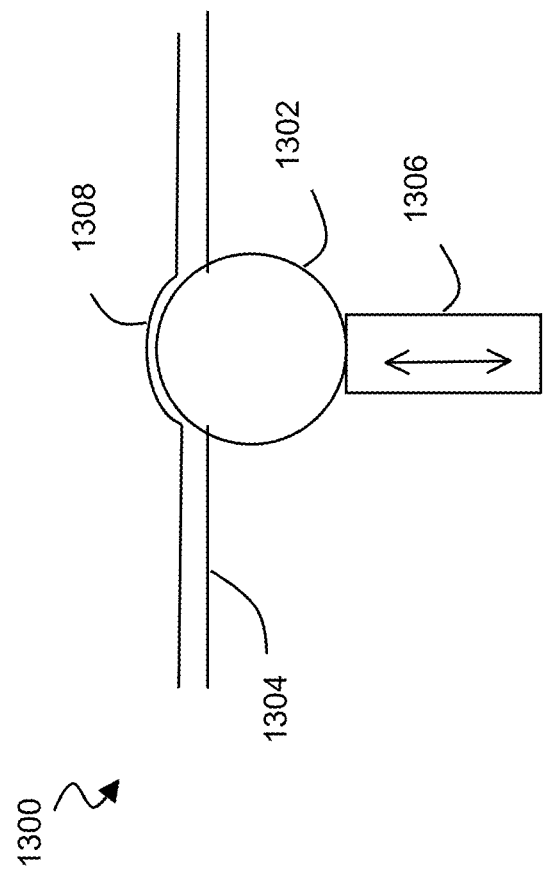
FIG. 13 shows a ball and detent tactile feedback mechanism.

FIG. 13 shows a ball detent mechanism for providing tactile feedback. While a variety of complementary engagement features for a base plate and thumbscrew are described above, it will be appreciated that numerous other techniques for providing tactile feedback for mechanical (and more specifically, rotational) movements are known in the art and may be suitably employed in a build platform leveling system as contemplated herein. By way of non-limiting example, a ball and detent mechanism may be usefully employed, as illustrated in FIG. 13.

In general, a ball detent mechanism is a mechanism for temporarily securing two items in relation to one another. The mechanism 1300 includes a ball 1302 or similarly-shaped object supported against a surface 1304 with a spring 1306 that biases the ball 1302 to protrude above the surface 1304. Another object includes a detent 1308 shaped to receive a portion of the ball 1302. When a lateral force is applied sufficient to overcome the force of the spring 1306, the ball 1302 retreats from the surface 1304 and permits the detent 1308 to move away from the ball. A number of ball detent fixtures may be provided, e.g., about the radius of a knob, thumbscrew or the like to provide a number of discrete rotational positions for a leveling mechanism as contemplate above. Still more generally, any mechanism that provides for tactile and/or audible feedback as a leveling adjustment moves from one discrete position to another may be adapted for use as the leveling mechanism for build platform leveling as contemplated herein.

A method for leveling the build platform of a three-dimensional printer and homing a z-axis position of the build platform and extruder of a three-dimensional printer will now be described.

Figure 14:
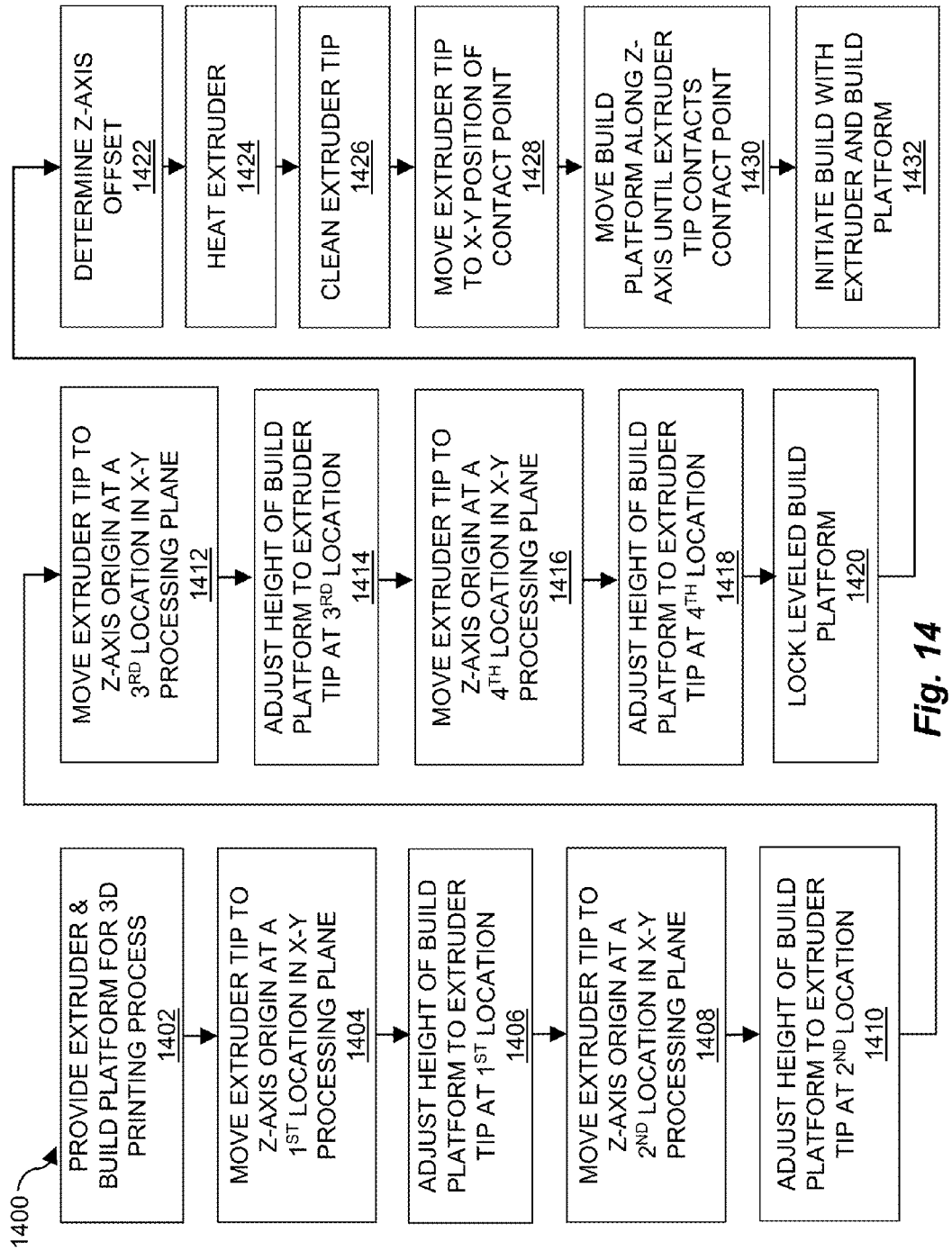
FIG. 14 is a flow chart illustrating a method for build platform leveling and homing.

FIG. 14 is a flow chart illustrating a method for build platform leveling and homing. As shown in FIG. 14, the method 1400 may include build platform leveling, homing a z-axis position of the build platform, and homing a z-axis offset of the contact point (i.e., reference homing). Alternatively, the method 1400 may include only one of build platform leveling, homing a z-axis position of the build platform, or reference homing.

Build platform leveling may generally include adjusting the build platform of a three-dimensional printer until it is substantially level. The "level" build platform may be substantially parallel to a plane normal to the direction of gravitational force (e.g., parallel to a flat surface supporting the three-dimensional printer or parallel to the ground). Additionally or alternatively, build platform leveling may include adjusting the build platform such that it is substantially parallel to the x-y positioning assembly. Build platform leveling may also or instead include adjusting the build platform of a three-dimensional printer until it is substantially parallel to another desired plane or otherwise accurately aligned in any suitable coordinate system of a three-dimensional printer.

By contrast, homing a z-axis position of the build platform may include placing the build platform in a position along a z-axis that is specified as a "home" position. The home position may be a predetermined position, where the components of the three-dimensional printer (e.g., the extruder and x-y positioning assembly) are calibrated or configured to operate in conjunction with the build platform disposed in this position. For example, the home position may be the z-axis origin (i.e., at a zero coordinate for the z-axis) for the extruder or build platform or another position located a specified distance from the z-axis origin. The home position may also or instead include any z-axis position that is offset by a predetermined amount from the origin. Thus, for example, the extruder may home to a top, bottom, or intermediate z-axis position within the build platform provided there is a suitable reference point that the extruder can contact or otherwise detect at that location. The home position may be the starting position for the build platform (or the extruder relative to the build platform) during a three-dimensional printing process. The home position may be the same from build to build, or it may change depending upon the specifications and requirements of a particular build. In an alternate embodiment, homing a z-axis position may include homing a z-axis position of the extruder, e.g., in relation to the build platform. In general, either or both of build platform leveling and homing a z-axis position of the build platform may be done in order to align the coordinate system of the build platform with the components of the three-dimensional printer (e.g., the extruder and the x-y-z positioning assembly).

Homing a z-axis offset of the contact point, i.e., reference homing, may include determining the z-axis offset of the contact point relative to a planar top surface of the build platform. Reference homing may be performed during the process for build platform leveling or before or after such a process (e.g., reference homing may be done independent from either or both of build platform leveling and homing a z-axis position of the build platform). In one aspect, reference homing may occur after the process for build platform leveling but before homing a z-axis position of the build platform.

In general, the method 1400 may support an interactive user process for leveling and homing a build platform. This may, for example, include two-point leveling, three-point leveling, four-point leveling, or leveling at any other number and arrangement of predetermined locations on the build platform relative to a printer tool or other positioning instrument.

As shown in step 1402, the method 1400 may include providing an extruder and build platform for a three-dimensional printing process. The extruder and build platform may be any as described herein, e.g., as described with reference to FIG. 1, or they may be any extruder and build platform known in the art of three-dimensional object fabrication.

The build platform may include a rigid base. The rigid base may be formed of a high-temperature material. For example, the rigid base may be constructed out of a metal material (or the like) having a high melting point relative to a cover of the build platform. The rigid base may include a frame. The rigid base may include one or more adjustment mechanisms for adjusting the height of the build platform at one or more locations or adjusting its overall height. The rigid base may have a planar top surface, which is suitable for supporting a cover. In one aspect, the rigid base may be optional. For example, one aspect includes a build platform with a planar top surface formed of a low-temperature material for receiving an object fabricated with the three-dimensional printing process, where the build platform may further include a contact point formed of a high-temperature material disposed outside of the planar top surface (or, alternatively, the contact point may be separate from the build platform, i.e., it may be another component).

The build platform may include a cover. The cover may be coupled to the planar top surface of the rigid base, and the cover itself may have a planar top surface for receiving an object fabricated with the three-dimensional printing process. The cover may be formed of a low-temperature material. For example, the cover may be constructed out of a plastic material (or the like) having a low melting point relative to the rigid base of the build platform, and more specifically a melting point below a typical operating temperature of an extruder or similar tool head. It may be advantageous to have the cover include a low-temperature material for many reasons, including without limitation, the cost of the material, the molding capability of the material (in particular, the injection moldability of the material) which can result in flatter and more dimensionally accurate surfaces, the flexibility of the material, and so forth. The cover may be a substantially rigid cover, a substantially flexible cover, or anything in between. In one aspect, the cover is flexible enough to conform to a rigid surface (e.g., the planar top surface of the rigid base). Additionally or alternatively the cover may be rigid enough to allow fabrication of an object by a three-dimensional printing process on its surface. The cover may also or instead be rigid enough such that adjusting the cover can level the build platform. It may be desirous to have a flexible planar top surface so that it can be flexed to remove printed components that adhere to the build platform. It may also or instead be desirous to have the material be flat and rigid during a build process. Thus, a cover may have sufficient flexibility and sufficient rigidity such that it may be flexed to removed printed objects, but rigid enough to be stable during a printing process. In one aspect, the planar top surface may be a flexible material that is engaged to a rigid "backbone" in a removable manner. The backbone may be part of the rigid base or the cover, or it may be another component. The backbone may have a substantially planar surface engaged with the cover. The backbone may include apertures, divots, or the like to ease in the removal or adjustment of the planar top surface. For example, in one aspect the backbone includes a chamfered backbone. The cover may include a planar top surface, which is capable of receiving an object fabricated with the three-dimensional printing process. The planar top surface of the cover may include a texture that aids in the removal of a fabricated object. The planar top surface may also or instead include apertures, where the apertures may cooperate with corresponding apertures or divots on the backbone. In addition to or instead of adjustment mechanisms on the rigid base, the cover may include one or more adjustment mechanisms for adjusting the height of the build platform at one or more locations relative to a coordinate system or component of the three-dimensional printer.

The adjustment mechanisms on either or both of the rigid base and cover may be part of a z-stage positioning mechanism, or the z-stage positioning mechanism may be a separate mechanism altogether for adjusting the z-axis position of the build platform. In one aspect, the z-stage positioning mechanism is fully controllable and is powered by a stepper motor or the like. The z-stage positioning mechanism may include a limit switch that detects when the build platform has reached a top or a bottom of an intended range within a working volume. This may prevent damage or malfunction that might result from moving beyond an intended range. The z-stage positioning mechanism may also include a locking mechanism that locks the build platform in place when it achieves a desired position. The locking mechanism may be a manual locking mechanism, e.g., thumbscrew(s) or the like, or an automatic locking mechanism.

The rigid base may include a contact point such as an element disposed outside of the planar top surface of the cover. In another aspect, the contact point may be an element disposed inside of the planar top surface of the cover (e.g., the contact point may be an element above the cover). In yet another aspect, the contact point may not be part of the rigid base, but rather is part of another component of the build platform, e.g., the cover. For example, the contact point may be coupled to the cover or the top planar surface of the build platform, which are made from a low-temperature material.

In another embodiment, the contact point may be separate from the build platform altogether, i.e., a separate component of the three-dimensional printer or printing system. The contact point may have a z-axis offset relative to the planar top surface of the build platform. Alternatively, the z-axis offset of the contact point may be relative to another component of the build platform or three-dimensional printer. The z-axis offset may be a predetermined z-axis offset, or it may be measured/calculated/determined, e.g., by a reference homing process (e.g., as explained with reference to step 1420) or by a sensor or the like. The contact point may be disposed upon a top surface of a protrusion, e.g., a cylindrical protrusion with a substantially flat surface. The contact point may also or instead be disposed upon different shapes, for example, a rectangular or box-shaped protrusion. The contact point may also include different surfaces, for example, the contact point may be the apex of a pyramid, cone, or other convex shape. The contact point may also or instead be disposed in the cover, or connected to the cover.

As shown in step 1404, the method 1400 may include moving the tip of the extruder to a z-axis origin at a first location in an x-y processing plane within the planar top surface of the cover, which may be a z-axis position at or above the planar top surface. The first location may be an arbitrary location, or it may be a predetermined location. For example, the planar top surface of the cover may have a substantially rectangular shape, where the first location may be disposed at or near a corner of the planar top surface. The first location may also or instead be disposed at or near a center of the build platform, or at any suitable location on a perimeter of the build platform such as a location where a height-adjustment leveling screw is located in the build platform or the underlying rigid base. This may also include moving the tool and/or the positioning assembly over a range of positions before moving to the first location, e.g., to locate a number of end stops or the like for the x-y-z positioning assembly. Step 1404 may be the first step in leveling the build platform of a three-dimensional printer, where the same first location is used for the first step of each leveling operation. Alternatively, a different first location may be used for the first step in a previous or subsequent leveling operation. For example, this step 1404 may be initiated in response to a user command, or automatically initiated when a printer is powered on for the first time (or for the first time by a customer after shipping from a manufacturing facility or distribution site). In one aspect, a user may issue a command through a control panel of a three-dimensional printer or from a computer connected to the three-dimensional printer. The x-y processing plane may be the x-y plane of the x-y-z positioning assembly as described herein. The x-y processing plane may be the plane of the planar top surface of the cover. Moving the tip of the extruder may include using the x-y-z positioning assembly to move the extruder, which may be controlled by a controller or the like.

As shown in step 1406, the method 1400 may include adjusting a height of the build platform to the tip of the extruder at the first location using a first control. The height of the build platform may be adjusted using an adjustment mechanism. The adjustment mechanism may be similar to those described above. For example, the adjustment mechanism may include a spring or the like disposed between the cover and rigid base of the build platform to provide a biasing force to the cover relative to the rigid base. The adjustment mechanism may also include a thumbscrew or the like that retains the spring in axial alignment and has a threaded end passing through the spring. In this manner, the thumbscrew may thread into the cover (e.g., into threads formed in the cover, or into a threaded nut or the like within the cover) and, by rotation in one direction, mechanically move the cover toward the rigid base against the biasing force of the spring. The thumbscrew may include any tool head suitable for grasping or for adjustment with a tool, or some combination of these. Rotation of the thumbscrew, or more generally any leveling or z-axis adjustment mechanism, may be manual or automated. The adjustment mechanism may instead include another component to mechanically move the build platform, where the adjustment mechanism includes a control component for initiating movement of the build platform. The control component may be manually or automatically driven.

Adjusting the height at the first location may include automatically increasing the height until the tip of the extruder contacts the planar top surface. This may include automatic control of the adjustment mechanism. Adjusting the height at the first location may include manually increasing the height until the tip of the extruder contacts the planar top surface. This may include manual control of the adjustment mechanism. The first control may include the controller discussed above, which may be used to automatically adjust the height of the build platform at the first location. The first control may also or instead include a separate controller configured to independently adjust the height of the build platform (e.g., the cover) at the first location. The first control may include a thumbscrew or the like that engages with, or is part of, an adjustment mechanism for manually adjusting the height of the build platform at the first location.

Adjusting the height at the first location, or any other location described herein, may include requesting an adjustment to an adjustment mechanism, such as any of the conditional instructions discussed herein. Adjusting the height at the first location, or any other location described herein, may also include a determination as to whether a leveling step is completed, e.g., as discussed above with reference to FIG. 12. This may also or instead include automated detection of height, such as by detecting contact or near contact of the extruder with the build platform using any suitable proximity sensor, contact switch, or the like. Thus, in an automated process, the extruder may be positioned in a desired location, and then a height adjustment mechanism may be activated until the extruder contacts the build platform.

It will also be appreciated that where multi-point leveling is used, a suitable number of substantially independent height adjustments may be provided. This may be an equal amount, e.g., with three height adjustments for a three-point leveling process, or it may be a different amount. For example, three-adjustments may be used in a four point leveling process or vice-versa, all without departing from the scope of this disclosure. It will also be understood that while each height adjustment is independently operable so as to permit control of planar skew of the cover, the adjustments may not be fully independent. Because the plate may be rigid, adjusting a height at one location may necessarily include changing the height in a linear fashion at other points throughout the build platform. Thus, as described herein, it will be understood that independent or substantially independent height adjustments are intended to include any independently actuatable height adjustments at different points within the plane of the build platform. Similarly, adjusting a height at a particular location will be understood to include controlling an independently actuatable height adjustment at that particular location, even though heights might be influenced at other locations throughout the build platform.

As shown in step 1408, the method 1400 may include moving the tip of the extruder to the z-axis origin at a second location in the x-y processing plane within the planar top surface of the cover, which may be a z-axis position at or above the planar top surface. The second location may be an arbitrary location, or it may be a predetermined location. For example, the planar top surface of the cover may have a substantially rectangular shape, where the second location may be disposed substantially in a corner of the planar top surface. The second location may be a location substantially opposite or adjacent to the first location.

As shown in step 1410, the method 1400 may include adjusting the height of the build platform to the tip of the extruder at the second location. The adjustment of the height of the build platform at the second location may be done by the same mechanism that adjusts the height at the first location, or it may be done by a different adjustment mechanism. Step 1410 may include using a second control that adjusts a second z-axis position of the second location substantially independently from a first z-axis position of the first location, thereby providing a leveled build platform substantially normal to the z-axis. Adjusting the height at the second location may include automatically increasing the height until the tip of the extruder contacts the planar top surface. This may include automatic control of an adjustment mechanism. Adjusting the height at the second location may include manually increasing the height until the tip of the extruder contacts the planar top surface. This may include manual control of an adjustment mechanism. The second control may include the controller discussed above, which may be used to automatically adjust the height of the build platform at the second location. The second control may also or instead include the same control as the first control discussed above, or it may be a different control. The first control and the second control may be separate components of an overall control system. The second control may include a thumbscrew or the like that engages with, or is part of, an adjustment mechanism for manually adjusting the height of the build platform at the second location.

As shown in step 1412, the method 1400 may include moving the tip of the extruder to the z-axis origin at a third location in the x-y processing plane within the planar top surface of the cover, which may be a z-axis position at or above the planar top surface. The third location may be an arbitrary location, or it may be a predetermined location. For example, the planar top surface of the cover may have a substantially rectangular shape, where the third location may be disposed substantially in a corner of the planar top surface. The third location may be a location substantially opposite or adjacent to the first location or the second location.

As shown in step 1414, the method 1400 may include adjusting the height of the build platform to the tip of the extruder at the third location. The adjustment of the height of the build platform at the third location may be done by the same mechanism that adjusts the height at the first location or the second location, or it may be done by a different adjustment mechanism. Step 1414 may include using a third control that adjusts a third z-axis position of the third location substantially independently from the first z-axis position of the first location and the second z-axis position of the second location, thereby providing a leveled build platform. The leveled build platform may be substantially normal to the z-axis, substantially parallel to the x-y positioning assembly (e.g., a gantry included in the x-y positioning assembly), substantially parallel to a plane normal to the direction of gravitational force, or any other desired alignment of the build platform. Adjusting the height at the third location may include automatically increasing the height until the tip of the extruder contacts the planar top surface. This may include automatic control of an adjustment mechanism. Adjusting the height at the third location may include manually increasing the height until the tip of the extruder contacts the planar top surface. This may include manual control of an adjustment mechanism. The third control may include the controller discussed above, which may be used to automatically adjust the height of the build platform at the third location. The third control may also or instead include the same control as the first control or the second control as discussed above, or it may be a different control. The first control, second control, and third control may be separate components of an overall control system. The third control may include a thumbscrew or the like that engages with, or is part of, an adjustment mechanism for manually adjusting the height of the build platform at the third location.

As shown in step 1416, the method 1400 may include moving the tip of the extruder to the z-axis origin at a fourth location in the x-y processing plane within the planar top surface of the cover. In this manner, the tip of the extruder may be moved to a position above a fourth location of the planar top surface of the cover. The fourth location may be an arbitrary location, or it may be a predetermined location. For example, the planar top surface of the cover may have a substantially rectangular shape, where the fourth location may be disposed substantially in a corner of the planar top surface. The fourth location may be a location substantially opposite or adjacent to the first location, the second location, or the third location. Although a first, second, third, and fourth location are discussed herein, a skilled artisan will understand that more or less locations may be used in the method 1400 described herein. For example, the build platform may be leveled in this manner using less than four locations, or using four or more locations.

As shown in step 1418, the method 1400 may include adjusting the height of the build platform to the tip of the extruder at the fourth location. The adjustment of the height of the build platform at the fourth location may be done by the same mechanism that adjusts the height at the first location, second location, or third location, or it may be done by a different adjustment mechanism. Step 1418 may include using a fourth control that adjusts a fourth z-axis position of the fourth location substantially independently from the first z-axis position of the first location, the second z-axis position of the second location, and the third z-axis position of the third location, thereby providing a leveled build platform substantially normal to the z-axis. Adjusting the height at the fourth location may include automatically increasing the height until the tip of the extruder contacts the planar top surface. This may include automatic control of an adjustment mechanism. Adjusting the height at the fourth location may include manually increasing the height until the tip of the extruder contacts the planar top surface. This may include manual control of an adjustment mechanism. The fourth control may include the controller discussed above, which may be used to automatically adjust the height of the build platform at the fourth location. The fourth control may also or instead include the same control as the first control, second control, or third control as discussed above, or it may be a different control. The first control, second control, third control, and fourth control may be separate components of an overall control system. The fourth control may include a thumbscrew or the like that engages with, or is part of, an adjustment mechanism for manually adjusting the height of the build platform at the fourth location.

In one aspect, any or all of the controls for adjusting the height of the build platform at various locations, e.g., the first control, second control, third control, fourth control, etc., may be configured to send a control signal to an adjustment mechanism for adjusting the height of the build platform to the tip of the extruder at the corresponding location. In another aspect, any or all of the controls for adjusting the height of the build platform at various locations, e.g., the first control, second control, third control, fourth control, etc., may include manual control of an adjustment mechanism. The manual control may include a thumbscrew with tactile feedback, and the adjustment mechanism may include a threaded rod and a spring. The threaded rod may be rotatably coupled to the build platform and coupled in a rotationally fixed manner to the thumbscrew, or vice-versa.

Steps 1404-1418 discussed above may be part of a "cold leveling" technique. In other words, these steps do not require any heating of the extruder, and such heating is preferably avoided where the build platform is meltable or otherwise thermally sensitive so that the extruder can be directly contacted to the build platform at various locations.

As shown in step 1420, the method 1400 may include locking the leveled build platform. Locking the leveled build platform may include locking the rigid base of the build platform, locking the cover of the build platform, or locking any other component of the build platform such that the build platform remains substantially level. Locking the leveled build platform may also or instead include locking the adjustment mechanisms that adjusted the height of the build platform at the various locations (e.g., first location, second location, third location, and so forth). Locking the leveled build platform may include manually locking the leveled build platform or automatically locking the leveled build platform. For example, in one aspect, the build platform may be locked by tightening a set of thumbscrews or the like so that it remains in a substantially level position. In another aspect, the adjustment mechanisms may automatically lock in place when the build platform is leveled. The leveled build platform may be locked such that the x-y plane of its planar top surface remains substantially fixed, but the entire build platform may still be able to move along its z-axis (i.e., the build platform may still have an adjustable height while its planar top surface remains level).

As shown in step 1422, the method 1400 may include determining the z-axis offset of the contact point, i.e., performing a reference homing operation. In general, the reference homing operation may include measuring the distance between a point on the planar top surface of the build platform and the contact point. Determining the z-axis offset of the contact point may include the use of a sensor, e.g., an optical sensor, or it may include a mechanical measurement process. For example, measuring the z-axis offset of the contact point may include recording a z-axis position of the build platform (or a component thereof) when the tip of the extruder is contacting the contact point, recording a z-axis position of the contact point, or recording a z-axis position of the tip of the extruder when the tip of the extruder is contacting the contact point. For reference purposes, this shall be referred to as the "first z-axis position." This step may be combined with homing a z-axis position of the build platform, or it may be independent from the process for homing a z-axis position of the build platform. Thus, recording the first z-axis position may include moving the tip of the extruder to an x-y position above the contact point, moving the tip of the extruder along the z-axis until the tip of the extruder contacts the contact point (or moving the build platform/contact point along the z-axis until the tip of the extruder contacts the contact point, or a combination of both), and recording the first z-axis position when the tip of the extruder is contacting the contact point. Measuring the z-axis offset of the contact point may further include recording a z-axis position of the build platform (or a component thereof) when the tip of the extruder is contacting the planar top surface of the build platform, or recording a z-axis position of the tip of the extruder when the tip of the extruder is contacting the planar top surface of the build platform. For reference purposes, this shall be referred to as the "second z-axis position." This step may be combined with leveling the build platform or homing a z-axis position of the build platform, or it may be independent from these processes. Thus, recording the second z-axis position when the tip of the extruder is contacting the planar top surface of the build platform may include moving the tip of the extruder to an x-y position above the planar top surface of the build platform (preferably the leveled build platform), moving the tip of the extruder along the z-axis until the tip of the extruder contacts the planar top surface (or moving the build platform along the z-axis until the tip of the extruder contacts the planar top surface, or a combination of both), and recording the second z-axis position when the tip of the extruder is contacting the planar top surface. After the z-axis positions of the contact point and build platform are obtained/recorded, measuring the z-axis offset of the contact point may also include calculating the difference between the first z-axis position and the second z-axis position. One skilled in the art will recognize that obtaining the z-axis positions of the contact point and build platform may be accomplished through different means, or may be accomplished in a different order of steps, all of which are intended for inclusion within the scope of this disclosure. The reference homing operation(s) described herein may be done with an unheated extruder, a heated extruder, while the extruder is heating up, or while the extruder is cooling down. For example, reference homing may be performed "cold," i.e., with an unheated extruder, and before homing the z-axis position of the build platform. This may be accomplished because the reference homing and leveling processes may take place even if there is a certain amount of build material stuck on the tip of the extruder. This is because, even with this build material on the extruder, there can be an equivalent displacement when reference homing.

As shown in step 1424, the method 1400 may include heating the extruder to an operating temperature. The operating temperature may be above a melting temperature of the low-temperature material of the cover and below a melting temperature of the rigid base. Step 1424 may be done in order to place the extruder in a ready-state for extruding build material in a three-dimensional printing process. Step 1424 may also or instead be done in order to clean the extruder, e.g., remove any excess build material that may have accumulated on or in the tip of the extruder. In this manner, step 1424 and the following steps may be part of a "hot homing" technique, where the extruder is heated to its operating temperature during these steps. Step 1424 may be the first step in homing a z-axis position of the build platform of a three-dimensional printer, or during the homing process. Alternatively, the extruder may be heated after homing a z-axis position of the build platform of a three-dimensional printer.

As shown in step 1426, the method 1400 may include cleaning the extruder tip. For example, when traveling to the x-y position corresponding to the contact point as explained below in step 1428, the tip of the extruder may be cleaned, or it may be cleaned before or after traveling to the x-y position corresponding to the contact point. The tip of the extruder may also or instead be cleaned before, after, or during another step of the homing process or leveling process described above. The tip of the extruder may be cleaned through engaging with a cleaning element. The cleaning element may include, without limitation, a brush, bristle, cloth, protrusion, or the like. The cleaning element may also or instead include a dispenser for excess build material purged by the extruder. The dispenser may include, without limitation, a bucket, basket, container, or the like. The extruder may purge excess build material into the dispenser before, during, or after engaging the cleaning element. In one aspect, the extruder is brought to a position over a dispenser (e.g., a bucket, bin, or the like), and excess build material is melted and extruded from the tip of the extruder into the dispenser. The tip of the extruder is then wiped over a cleaning element (e.g., a brush) to remove any leftover build material on the tip of the extruder. In this manner, the tip of the extruder is cleaned. In another aspect, the extruder is purged after wiping the extruder over the cleaning element. Purging of the extruder may also or instead include heating the extruder, purging and unloading build material from the extruder into a dispenser (e.g., to remove build material from a drive gear), waiting for the extruder to cool, and wiping the tip of the extruder with a cleaning element (e.g., to remove any loose, cooled build material). Purging the extruder or cleaning the extruder tip may take place before the leveling process because any build material on the tip of the extruder can adversely affect leveling. Alternatively, purging the extruder or cleaning the extruder tip may take place at another time, or not at all.

As shown in step 1428, the method 1400 may include moving the tip of the extruder to an x-y position corresponding to the contact point. In this manner, the tip of the extruder may be moved to a position above the contact point.

As shown in step 1430, the method 1400 may include moving the build platform along the z-axis until the tip of the extruder contacts the contact point. In other words, after the tip of the extruder is moved to the x-y position corresponding to the contact point, e.g., to a position above the contact point, the build platform may be moved up until the contact point and the tip of the extruder touch. In one aspect, the contact point is made from the same material as the rigid base of the build platform, e.g., a metal material. In an aspect, when the extruder makes contact with the contact point, excess build material may be transferred from the tip of the extruder to the contact point thereby cleaning the tip of the extruder. Additionally or alternatively, build material may be extruded from the tip of the extruder onto the contact point. In one aspect, the contact point may include a cleaning element, for example, a cleaning element as discussed above.

Additionally or alternatively, the extruder may move toward the build platform during a leveling process. To this end, or otherwise for use in leveling, measuring, homing, etc., the extruder may also or instead include a Hall effect sensor (or the like) and a spring loaded nozzle. The extruder may thus include any of the extruders described in commonly owned U.S. patent application Ser. No. 14/081,922, which is hereby incorporated by reference in its entirety.

As shown in step 1432, the method 1400 may include initiating a build with the extruder and the build platform, and thus initiating a build with a three-dimensional printer.

Figure 15:
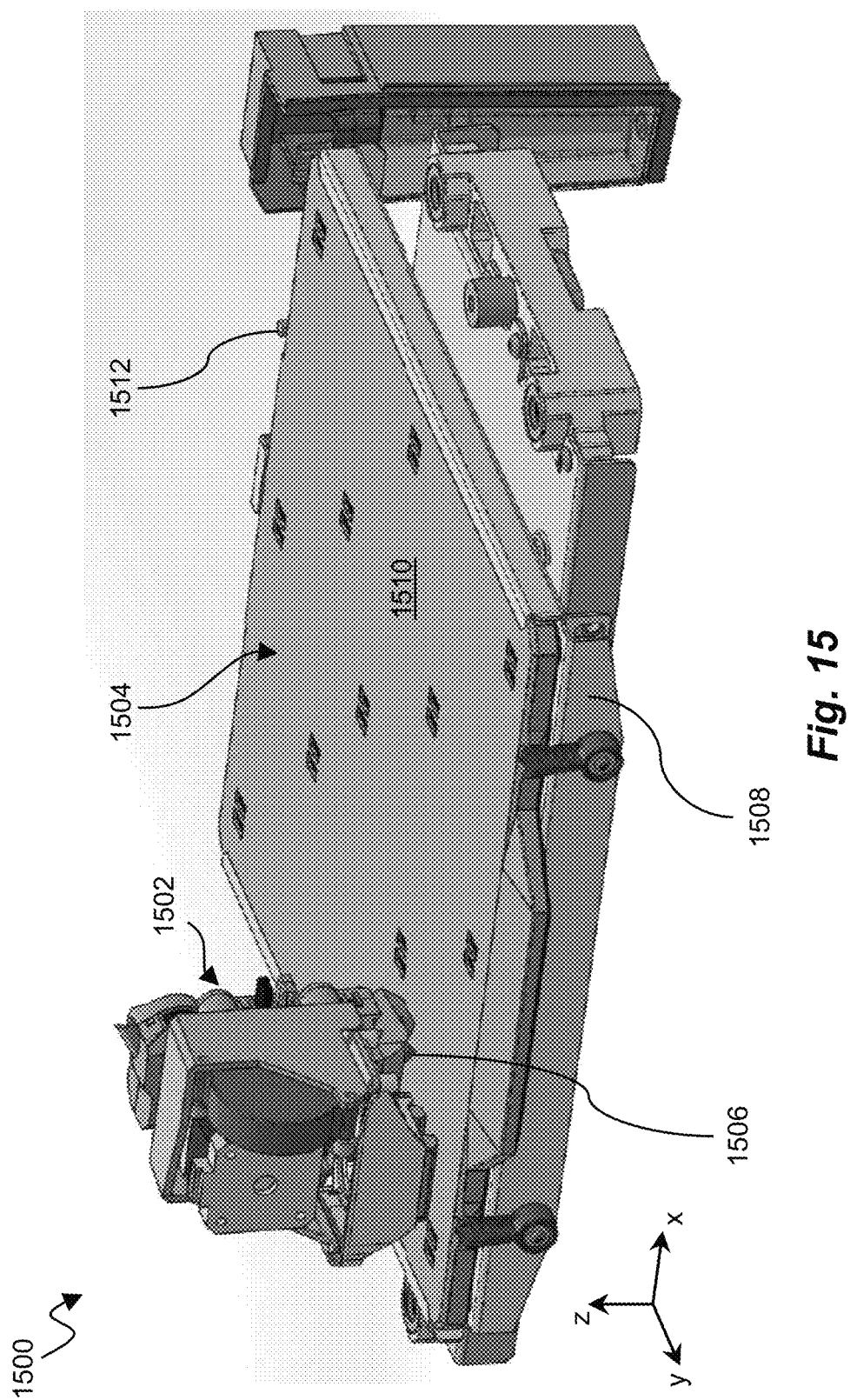
FIG. 15 is a perspective view of a three-dimensional printer with an extruder in a first location.

FIG. 15 is a perspective view of a three-dimensional printer with an extruder in a first location. Specifically, FIG. 15 shows a three-dimensional printer 1500 with an extruder 1502 and a build platform 1504. The three-dimensional printer 1500 may be similar to the three-dimensional printers discussed throughout this disclosure.

The extruder 1502 may include a tip 1506 for extruding a build material during a three-dimensional build process.

The build platform 1504 may include a rigid base 1508 and a cover 1510. In FIG. 15, the cover 1510 is coupled to the rigid base 1508, where the cover 1510 provides a planar top surface for receiving an object fabricated with the three-dimensional printing process. The rigid base 1508 may include a contact point 1512. As shown in FIG. 15, the contact point 1512 may be disposed outside of the planar top surface of the cover 1510 having a predetermined z-axis offset relative to the planar top surface of the cover 1510. As described above, in another aspect, the contact point may be separate from the rigid base. Further, as described above, in another aspect, the rigid base need not be included, and the build platform may thus include a planar top surface made of a low-temperature material.

Figure 16:
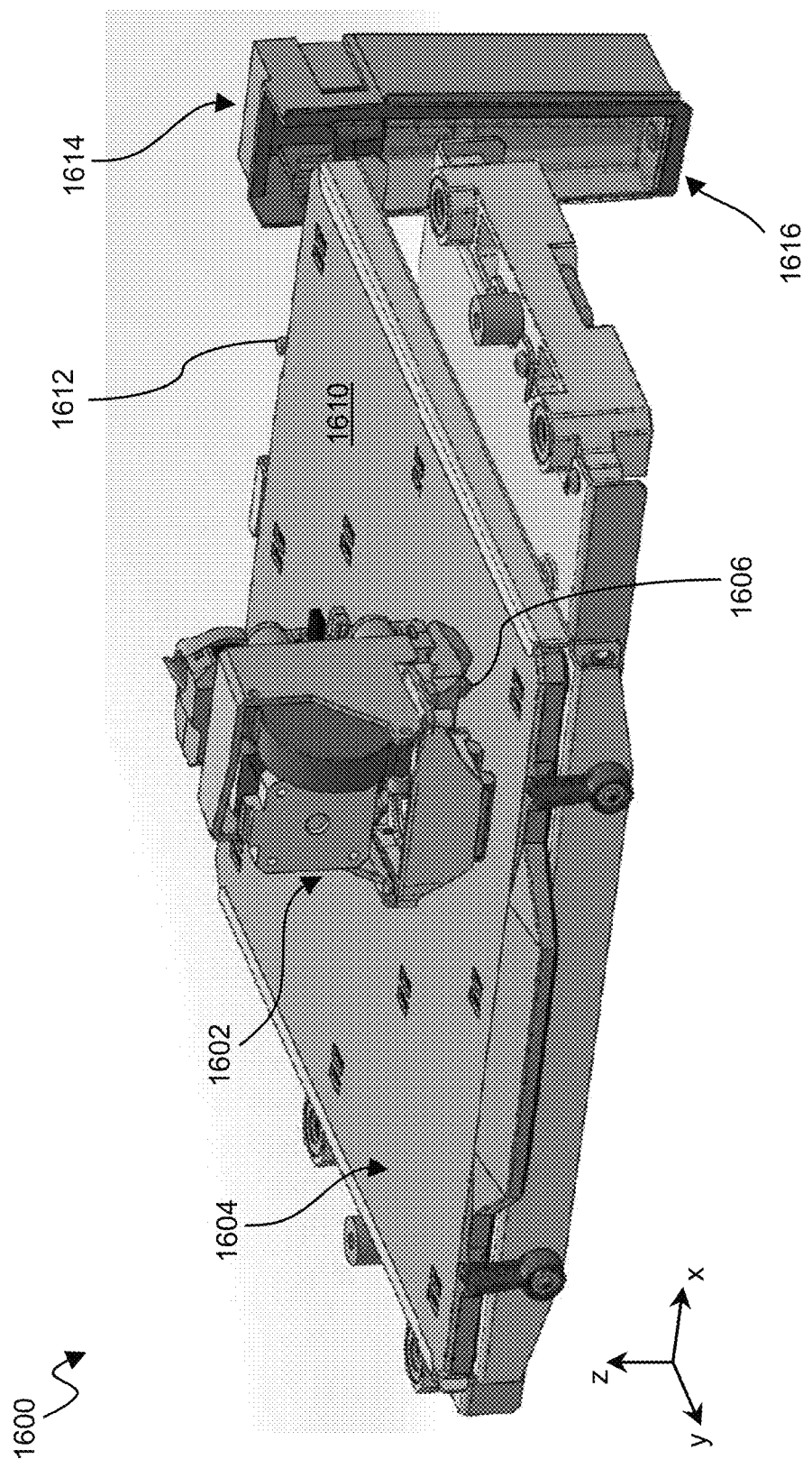
FIG. 16 is a perspective view of a three-dimensional printer with an extruder in a second location.

FIG. 15 shows the three-dimensional printer 1500 with the extruder 1506 in a first location within the planar top surface of the cover 1510. In FIG. 15, the tip 1506 of the extruder 1502 is disposed at a z-axis origin in an x-y processing plane within the planar top surface of the cover 1510. In a leveling operation, the height of the build platform 1504 may be adjusted to the tip 1506 of the extruder 1502 at the first location. The tip 1506 of the extruder 1502 may then be moved to a second location as shown in FIG. 16, which is described below. Although FIG. 15 is referred to as showing the extruder 1506 in a first location, one skilled in the art will understand that a leveling process may begin at any of the locations described in FIGS. 15-16, or at another location.

FIG. 16 is a perspective view of a three-dimensional printer with an extruder in a second location. Specifically, FIG. 16 shows a three-dimensional printer 1600 with an extruder 1602 and a build platform 1604, where the extruder 1602 is in a second location within the planar top surface of the cover 1610. In FIG. 16, the tip 1606 of the extruder 1602 is disposed at the z-axis origin in the x-y processing plane within the planar top surface of the cover 1610. In a leveling operation, the height of the build platform 1604 may be adjusted to the tip 1606 of the extruder 1602 at the second location, thereby leveling the build platform 1604. The z-axis position of the second location may be adjusted substantially independently from the z-axis position of the first location shown in FIG. 15. Additionally, the tip 1606 of the extruder 1602 may then be moved to a third location, a fourth location, and so on, where the height of the build platform 1604 may be independently adjusted to the tip 1606 of the extruder 1602 at each location, thereby further leveling the build platform 1604.

Figure 17:
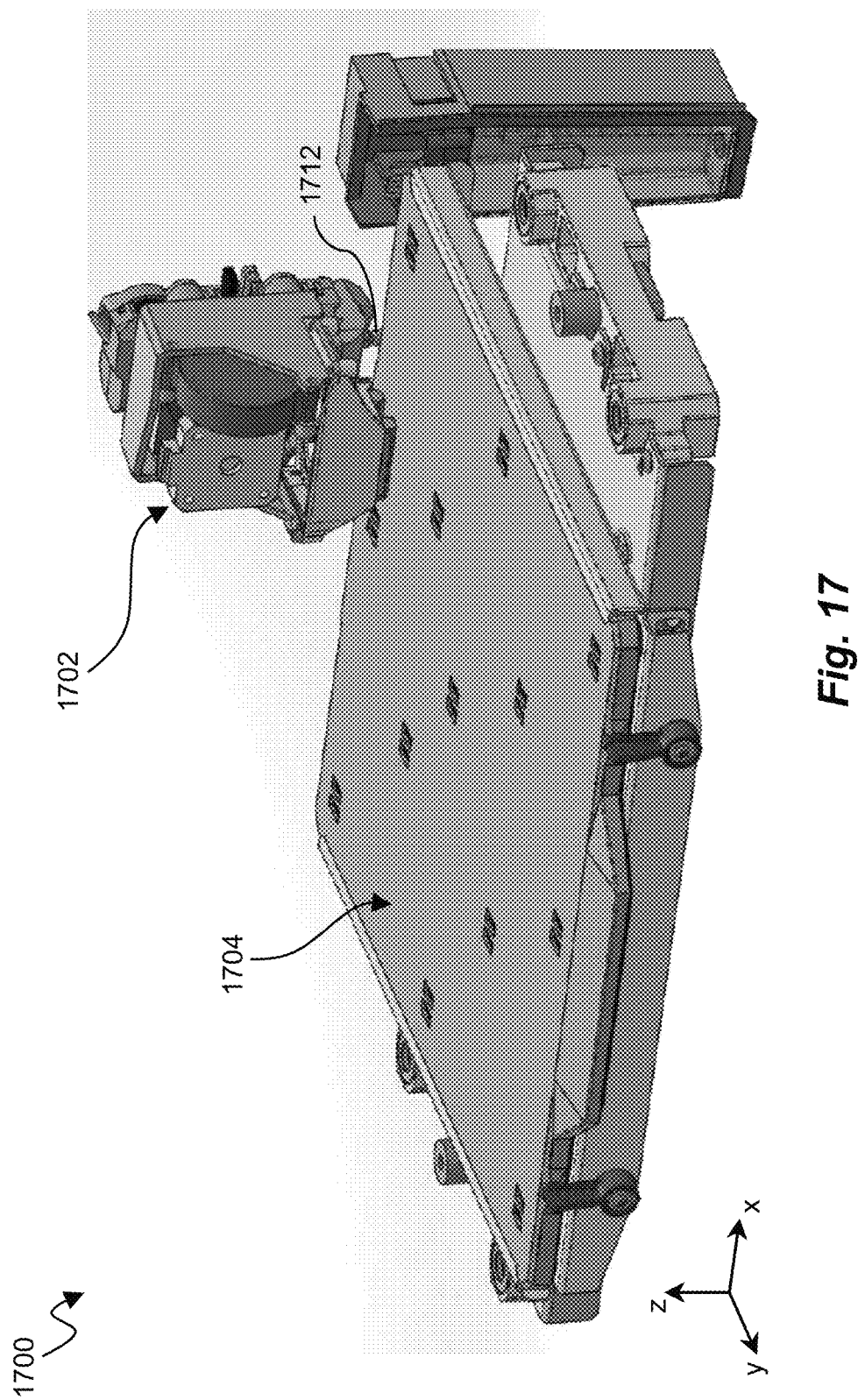
FIG. 17 is a perspective view of a three-dimensional printer with an extruder in an x-y position corresponding to a contact point.

After the build platform 1604 is leveled, the extruder 1602 may be heated to an operating temperature. In addition, or in the alternative, after the build platform 1604 is leveled, the tip 1606 of the extruder 1602 may be moved to an x-y position corresponding to the contact point 1612 as shown in FIG. 17, which is described below. For example, the extruder 1602 may be heated to an operating temperature during the process for homing the z-axis position of the build platform 1604. In one aspect, the extruder 1602 may be unheated during the reference homing process described herein.

A cleaning tool 1614 may be included with, e.g., brushes to remove extrudate or other material on the exterior of the tip 1606 of the extruder 1602, along with a purge bucket 1616 or the like to receive extruded material during a purge or other cleaning operation on the extruder 1602. In operation, the extruder 1602 may be periodically moved to the cleaning tool 1614 for cleaning at any suitable time before, during, or after a fabrication process.

FIG. 17 is a perspective view of a three-dimensional printer with an extruder in an x-y position corresponding to a contact point. Specifically, FIG. 17 shows a three-dimensional printer 1700 including an extruder 1702 and a build platform 1704, where the tip of the extruder 1702 is disposed over the contact point 1712. This may be part of a homing operation, where the z-axis position of the build platform 1704 of a three-dimensional printer 1700 is homed as described herein. This may also or instead be part of a reference homing process, where the z-axis offset of the contact point 1712 is determined.

Figure 18:
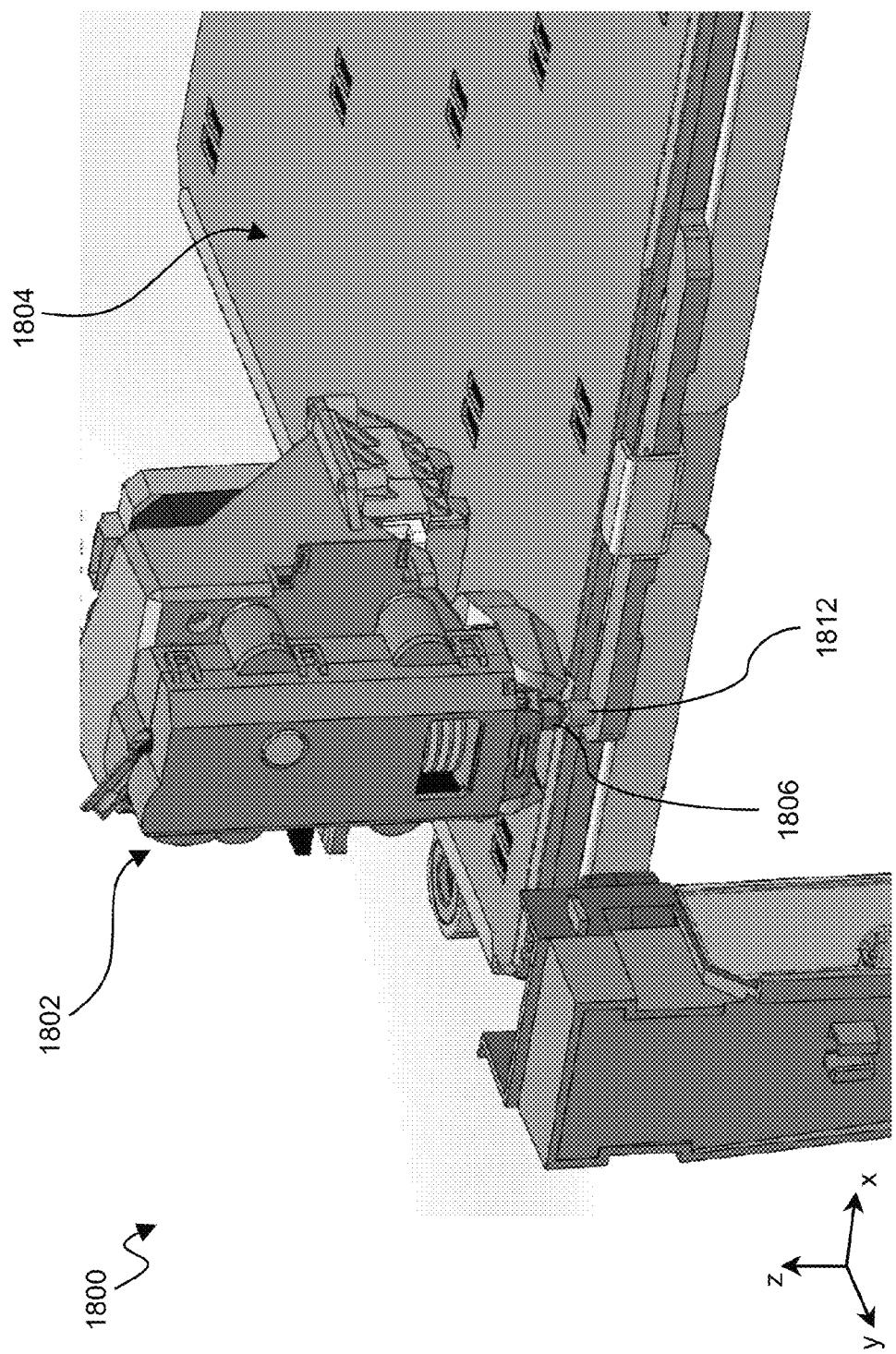
FIG. 18 is a close-up view of an extruder in an x-y position corresponding to a contact point.
Figure 19:
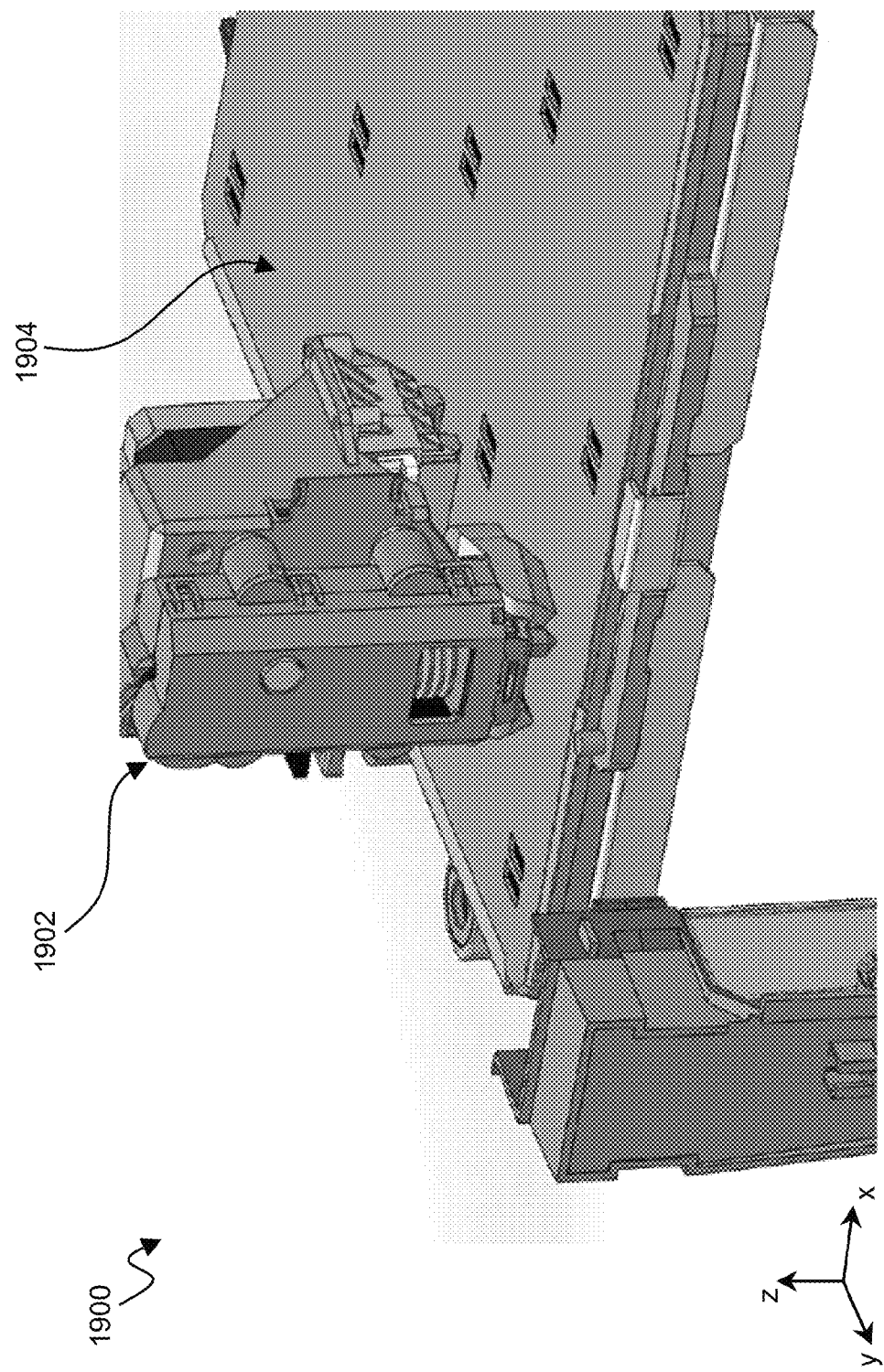
FIG. 19 is a close-up view of an extruder in a ready position.

FIG. 18 is a close-up view of an extruder in an x-y position corresponding to a contact point. Specifically, FIG. 18 shows the tip 1806 of the extruder 1802 disposed above the contact point 1812. In FIG. 18, the build platform 1804 has been moved along the z-axis such that the tip 1806 of the extruder 1802 is contacting the contact point 1812. This action may home the z-axis position of the build platform 1804. After the build platform 1804 is homed, the extruder 1802 may be moved to a ready position as shown in FIG. 19, which is described below. This homing procedure usefully permits realignment to the z-axis origin before each fabrication process, even when the extruder 1802 is hot. The contact point 1812 may be formed of metal or other material capable of withstanding elevated temperatures such as typical operating/extrusion temperatures of the extruder 1806.

FIG. 19 is a close-up view of an extruder in a ready position. Specifically, FIG. 19 shows the extruder 1902 of a three-dimensional printer 1900, where the three-dimensional printer 1900 is ready to initiate a build with the extruder 1902 and the build platform 1904.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
   providing an extruder and a build platform for a three-dimensional printing process, the build platform including a planar top surface formed of a low-temperature material for receiving an object fabricated with the three-dimensional printing process, the build platform further including a contact point formed of a high-temperature material disposed outside of the planar top surface, the contact point having a z-axis offset relative to the planar top surface;
   moving a tip of the extruder to a z-axis origin at a first location in an x-y processing plane within the planar top surface;
   adjusting a height of the build platform to the tip of the extruder at the first location using a first control;
   moving the tip of the extruder to the z-axis origin at a second location in the x-y processing plane within the planar top surface;
   adjusting the height of the build platform to the tip of the extruder at the second location using a second control that adjusts a second z-axis position of the second location substantially independently from a first z-axis position of the first location, thereby providing a leveled build platform;
   heating the extruder to an operating temperature above a melting temperature of the low-temperature material of the planar top surface and below a melting temperature of the contact point;
   moving the tip of the extruder to an x-y position corresponding to the contact point; and
   moving the build platform along the z-axis until the tip of the extruder contacts the contact point.

2. The method of claim 1 further comprising initiating a build with the extruder and the build platform.

3. The method of claim 1 wherein the planar top surface is part of a cover, the build platform further includes a rigid base formed of the high-temperature material and having a second planar top surface, the cover is coupled to the second planar top surface of the rigid base, and wherein the rigid base includes the contact point.

4. The method of claim 1 further comprising:
   moving the tip of the extruder to the z-axis origin at a third location in the x-y processing plane within the planar top surface; and
   adjusting the height of the build platform to the tip of the extruder at the third location using a third control that adjusts a third z-axis position of the third location substantially independently from the first z-axis position of the first location and the second z-axis position of the second location, thereby providing the leveled build platform substantially normal to the z-axis.

5. The method of claim 1 further comprising locking the leveled build platform.

6. The method of claim 1 wherein the z-axis offset of the contact point is predetermined.

7. The method of claim 1 further comprising determining the z-axis offset of the contact point.

8. The method of claim 7 wherein determining the z-axis offset of the contact point includes:
   recording a first z-axis position of the contact point when the tip of the extruder is contacting the contact point;
   moving the tip of the extruder to an x-y position above the planar top surface of the leveled build platform;
   moving at least one of the tip of the extruder and the build platform along the z-axis until the tip of the extruder contacts the planar top surface;
   recording a second z-axis position of the planar top surface when the tip of the extruder is contacting the planar top surface; and
   calculating the difference between the first z-axis position and the second z-axis position.

9. The method of claim 1 wherein adjusting the height at the first location includes automatically increasing the height until the tip of the extruder contacts the planar top surface.

10. The method of claim 1 wherein adjusting the height at the first location includes manually increasing the height until the tip of the extruder contacts the planar top surface.

11. The method of claim 1 further comprising cleaning the tip of the extruder.

12. The method of claim 11 wherein cleaning the tip of the extruder includes engaging a cleaning element.

13. The method of claim 12 wherein the cleaning element includes a brush.

14. The method of claim 12 wherein the cleaning element includes a dispenser for excess build material purged by the extruder.

15. The method of claim 1 wherein the first control is configured to send a control signal to an adjustment mechanism for adjusting the height of the build platform to the tip of the extruder at the first location.

16. The method of claim 1 wherein the first control includes a manual control of an adjustment mechanism.

17. The method of claim 16 wherein the manual control includes a thumbscrew with tactile feedback, and the adjustment mechanism includes a threaded rod and a spring.

18. The method of claim 17 wherein the threaded rod is rotatably coupled to one of either the build platform or the thumbscrew and coupled in a rotationally fixed manner to the other one of either the build platform or the thumbscrew.

* * * * *